US007796863B2

(12) United States Patent
Uesaka et al.

(10) Patent No.: US 7,796,863 B2
(45) Date of Patent: Sep. 14, 2010

(54) APPARATUS AND COMPUTER-READABLE PROGRAM FOR GENERATING VOLUME IMAGE

(75) Inventors: Yasushi Uesaka, Sanda (JP); Tomoyuki Okada, Nara (JP); Masayuki Kozuka, Neyagawa (JP)

(73) Assignee: Panasonic Corporation, Osaka (JP)

( * ) Notice: Subject to any disclaimer, the term of this patent is extended or adjusted under 35 U.S.C. 154(b) by 1144 days.

(21) Appl. No.: 10/561,208

(22) PCT Filed: Jun. 30, 2004

(86) PCT No.: PCT/JP2004/009574

§ 371 (c)(1), (2), (4) Date: Dec. 16, 2005

(87) PCT Pub. No.: WO2005/002232

PCT Pub. Date: Jan. 6, 2005

(65) Prior Publication Data

US 2006/0165388 A1 Jul. 27, 2006

(51) Int. Cl.

| | |
|---|---|
| ***H04N 5/00*** | (2006.01) |
| ***H04N 5/91*** | (2006.01) |
| ***H04N 7/16*** | (2006.01) |
| ***H04N 7/26*** | (2006.01) |
| ***H04N 9/79*** | (2006.01) |
| ***H04J 3/04*** | (2006.01) |
| ***G06F 3/00*** | (2006.01) |

(52) U.S. Cl. .......................... 386/125; 386/45; 386/82; 386/124; 386/126; 370/535; 710/5; 710/6; 710/7; 715/723; 725/135; 725/138

(58) Field of Classification Search ................ 386/125, 386/45, 82, 124, 126, E5.064, E9.013; 375/535, 375/E7.022; 710/5, 6, 7; 715/723; 725/135, 725/138; G9B/20.002, 27.01, 27.012, 27.051; 370/535, E7.022

See application file for complete search history.

(56) References Cited

U.S. PATENT DOCUMENTS

| | | | | |
|---|---|---|---|---|
| 6,138,175 | A * | 10/2000 | deCarmo | 710/5 |
| 6,724,981 | B1 | 4/2004 | Park et al. | |
| 7,039,298 | B1 * | 5/2006 | Watkins | 386/125 |
| 2002/0085592 | A1 * | 7/2002 | Ono et al. | 370/535 |
| 2002/0157112 | A1 | 10/2002 | Kuhn | |
| 2003/0193520 | A1 * | 10/2003 | Oetzel | 345/723 |

FOREIGN PATENT DOCUMENTS

| | | |
|---|---|---|
| EP | 0 877 377 | 11/1998 |
| EP | 1 357 749 | 10/2003 |
| EP | 1 422 710 | 5/2004 |
| JP | 2002-176623 | 6/2002 |
| JP | 2003-109300 | 4/2003 |
| JP | 2003-153170 | 5/2003 |
| WO | 2004/023815 | 3/2004 |

* cited by examiner

*Primary Examiner*—Thai Tran
*Assistant Examiner*—Syed Y Hasan

(57) ABSTRACT

Provided is a generating apparatus that generates a DVD-Video volume image, and a BD-ROM volume image, that each have: a digital stream, path information, and a jump table, where in the respective digital streams, a button command to be executed by a playback apparatus, in playing back the digital stream, is incorporated. A BD-scenario generating apparatus 7 obtains path information, a jump table, and a button command, which are for the BD-ROM, by converting any one of the description schemes for the path information, the jump table, and the button command for the DVD-Video.

6 Claims, 34 Drawing Sheets

EXAMPLE PROGRAM IN DVD-Video

```
BUTTON1
  GPO = 1 & Link PGC Tail      : SET VALUE FOR GPO, AND MOVE TO PGC Tail (EXECUTE Post COMMAND)
BUTTON2
  GPO = 2 & Link PGC Tail      : MOVE TO PGC Tail
BUTTON3
  GPO = 3 & Link PGC Tail      : MOVE TO PGC Tail
```

B

```
PGC Tail
  01 if(GPO! = 1)goto 05       : IF GPO IS "1", EXECUTE FROM "02"
  02    Audio Stream = 1       : SELECT AUDIO STREAM
  03    Highlighted Button = 2 : AFTER RETURNING, MAKE SURE NEXT BUTTON IS SELECTED
  04    Jump Title10           : JUMP TO TITLE 10

  05 if(GPO! = 2)goto 09       : WHEN GPO IS "2", EXECUTE FROM "06"
  06    Audio Stream = 1
  07    Highlighted Button = 3
  08    Jump Title11
  09 Audio Stream = 2
  10 Highlighted Button = 1
  11 Jump Title11
```

FIG.28

BUTTON1
  Audio Stream = 1 : SELECT AUDIO STREAM
  Highlighted Button = 2 : AFTER RETURNING, MAKE SURE NEXT BUTTON IS SELECTED
  Jump Title10 : JUMP TO TITLE 10

BUTTON2
  Audio Stream = 1 : SELECT AUDIO STREAM
  Highlighted Button = 3 : AFTER RETURNING, MAKE SURE NEXT BUTTON IS SELECTED
  Jump Title11 : JUMP TO TITLE 11

BUTTON1
  Audio Stream = 2 : SELECT AUDIO STREAM
  Highlighted Button = 1 : AFTER RETURNING, MAKE SURE NEXT BUTTON IS SELECTED
  Jump Title11 : JUMP TO TITLE 11 (WITH DIFFERENT AUDIO)

APPARATUS AND COMPUTER-READABLE PROGRAM FOR GENERATING VOLUME IMAGE

TECHNICAL FIELD

The present invention relates to a generating apparatus that generates a volume image targeting a read-only optical disc, and particularly relates to improvements in a case where a single movie content is distributed using two or more read-only discs which differ in application layer from each other.

BACKGROUND ART

Chargeable-basis distribution of movie contents through an optical disc is an extremely large source of revenue for the movie suppliers such as Hollywood. The generating apparatus that professionals of movie production use for authoring is an indispensable apparatus for distributing movie contents through an optical disc, and higher quality therefor is required than ever. The authoring performed by such a generating apparatus determines format of the application layer of an optical disc, in production of a master of the optical disc. The data having the format determined by the authoring is called volume image. This volume image includes a digital stream that has been compressed and encoded in accordance with the MPEG2 standard, and also includes a scenario about this digital stream.

The conventional authoring used to target read-only DVD (generally called DVD-Video). However, recent attention is directed to how to perform authoring to read-only Blu-ray Disc (hereinafter "BD-ROM") that is expected to make a market debut in the near future. The prime merit of distributing movie contents through the BD-ROM is that it enables distribution of movie contents that can be played back with high-definition, and so it is optimal for wide televisions of 32 and 40 models. The movie contents distributed through BD-ROM can be played back with almost as good quality as theater screens, and even movie fans who have sharpest eye will be impressed.

However, despite such a large merit of the BD-ROM over the DVD-Video, the DVD-Video still has an edge in that how penetrated and acknowledged it is in society, over the BD-ROM. It is quite unlikely that, even after emergence of the BD-ROM, distribution through the DVD-Video will stop being used. If distribution through the DVD-Video is expected to continue, the production studios will have to be ready for distribution through both of the existing DVD-Video and the BD-ROM. This will double the burden born by the production studios, since they have to expend twice as much effort as before, for one movie.

DISCLOSURE OF THE INVENTION

The object of the present invention is to provide, when attempting distribution of movie contents through the BD-ROM in addition to through the DVD-Video, a generating apparatus that completes each of volume images for the BD-ROM and for the DVD-Video, without spending twice as much time and effort as for generating only the volume image for DVD-Video.

The DVD-Video standard was developed around the year 1995. In those days, the hardware performance of computers were much too poor, compared to that of today. However, people still tried to realize a variety of playback control desired by the movie production companies of Hollywood, on such poor-performance hardware. As a result, in those days, a variety of restriction had to be given to the scenario for DVD-Video digital streams. This resulted in complication of scenario for the digital stream, thereby making the digital stream difficult to understand.

On the other hand, the BD-ROM is a standard that is currently under development (as of June 2003). Since the remarkable improvement in hardware performance compared to the times in which the DVD-Video was developed, many of the restrictions imposed on the DVD-Video can be superfluous on the BD-ROM. The data structure of the BD-ROM scenario is expected to be simpler and clearer than that for the DVD-Video scenario.

However, the data structure for the BD-ROM scenario is not a simplified version of the data structure for the DVD-Video scenario. The DVD-Video does not at all take into account the compatibility with the recording standard, whereas the BD-ROM aims to realize compatibility with the recording standard (BD-RE) This makes the scenario-data structure totally different for the BD-ROM from the DVD-Video.

Although the volume image for BD-ROM looks similar to that of the DVD-Video, it is very different in reality. Therefore, it is impossible to create a volume image for BD-ROM, by partly changing a volume image for DVD-Video. Even when the volume image for DVD-Video is complete, it is still necessary to create such as path information and management information from scratch, in creation of the BD-ROM volume image. Even so, the BD-ROM also tries to realize a variety of playback control, just as with the DVD-Video. It can be said that BD-ROM and DVD-Video share the same concept that underlies the realization of playback control.

The generating apparatus relating to the present invention obtains the basis of the BD-ROM volume image, from the DVD-Video volume image.

To be more specific, the aforementioned object is achieved by a generating apparatus that is equipped with a conversion unit operable to convert first scenario data written under a first scenario-description scheme for the first disc, into second scenario data written under a second scenario-description scheme for the second disc; and a formatting unit operable to obtain the second volume image that contains a digital stream and the second scenario data that has been obtained by the conversion unit.

With this construction, once a DVD-Video volume image has been generated after spending a large amount of man-hour, a BD-ROM volume image can be generated, by converting the scenario included in the DVD-Video volume image. This will save time and trouble required for distribution through a plurality of discs, since this generating apparatus, in order to generate a volume image for BD-ROM, can make use of the information resources cultivated for distribution through the DVD-Video.

It should be noted here that the digital stream that the formatting unit uses in obtaining the second volume image can be either 1) a newly generated digital stream for the second disc, or 2) a digital stream that has been generated for the first disc.

Here, the first scenario data is path information defining a playback path of a digital stream contained in the first volume image, and the second scenario data is path information defining a playback path of the digital stream contained in the second volume image, each playback path being comprised of one or more logical playback sections, playback sections are defined by information specifying starting address and playback time length under the first scenario-description scheme, and the conversion performed by the conversion unit is to replace the information specifying starting address and playback time length with starting-time information and ending-time information.

With this construction, even in a case when the playback sections are defined by time information so as to be compatible with the recording standard, path information defining such playback sections can be generated, from the path information generated for the first disc. Since it becomes possible to automatically generate path information for the second disc, this will save users from carrying out operations to decide, while looking at the playback screen of a digital stream, starting and ending points for a playback section, that require attention to details.

Here, the digital stream contained in the first volume image and the digital stream contained in the second volume image respectively are paired with corresponding path information to constitute a title, the first scenario data and the second scenario data are respectively a jump table that a playback apparatus refers to when jump is performed from an entire menu of the corresponding disc to the corresponding title, the first scenario-description scheme allows two jump tables: a first table for the entire first disc; and a second table that is created for a domain that the title belongs to, and the conversion performed by the conversion unit is to replace the first and second tables with one jump table for the entire second disc.

For the first-disc volume image, two-phase jump which is via the first and second tables is used to determine the digital stream; whereas for the second-disc volume image, one-phase jump is used to determine the digital stream. With the above construction, the second-disc volume image is created so that one-phase jump can identify the path information. This makes it possible, even in a case where access method for path information is different from disc to disc, to automatically generate a jump table for the second disc, thereby eliminating time and trouble for the user who performs authoring.

Here, the domain is assigned attribute information representing image/audio attributes of the titles that belong to the domain, and the generating apparatus includes a generating unit operable to generate attribute information for the digital stream contained in the second volume image, based on the attribute information assigned to the domain.

In the first disc, if digital streams that share the same attribute are grouped into one domain, attribute information is generated for each of the digital streams, with use of the attribute of the domain. This eliminates time and trouble for the user, since it is unnecessary to create attribute information for each digital stream individually from scratch.

Here, the first scenario data and the second scenario data are respectively one or more commands that have been incorporated in the corresponding digital stream, and the first scenario-description scheme and the second scenario-description scheme are respectively a scheme under which the corresponding commands are described.

With this construction, even if the first disc is different from the second disc, in grammar for commands for making the playback apparatus perform playback control, the conversion unit automatically generates commands for the second disc, using the commands that have been detected for the second disc. Therefore, this will eliminate time and trouble to be spent for such as re-coding of commands, and debugging for the purpose of generating the second disc, thereby enhancing the operating efficiency.

BRIEF DESCRIPTION OF THE DRAWINGS

FIG. 27A is a diagram showing one example of the three button commands described in an NV-Pack.

FIG. 27B is a diagram showing one example of the command described in the PGCTail.

FIG. 28 is a diagram showing the button command obtained by undergoing the process performed by the command conversion unit 14.

BEST MODE FOR CARRYING OUT THE INVENTION

As follows, the generating apparatus that relates to the present invention is described by way of embodiments, with reference to the drawings.

First, the use pattern of the generating apparatus is described. The generating apparatus relating to the present invention is set in a production studio, and is provided for users' use for the distribution of movie contents. Specifically the generating apparatus is used for generating digital streams and scenarios that constitute volume images for the DVD or for the BD-ROM.

Figure 1:
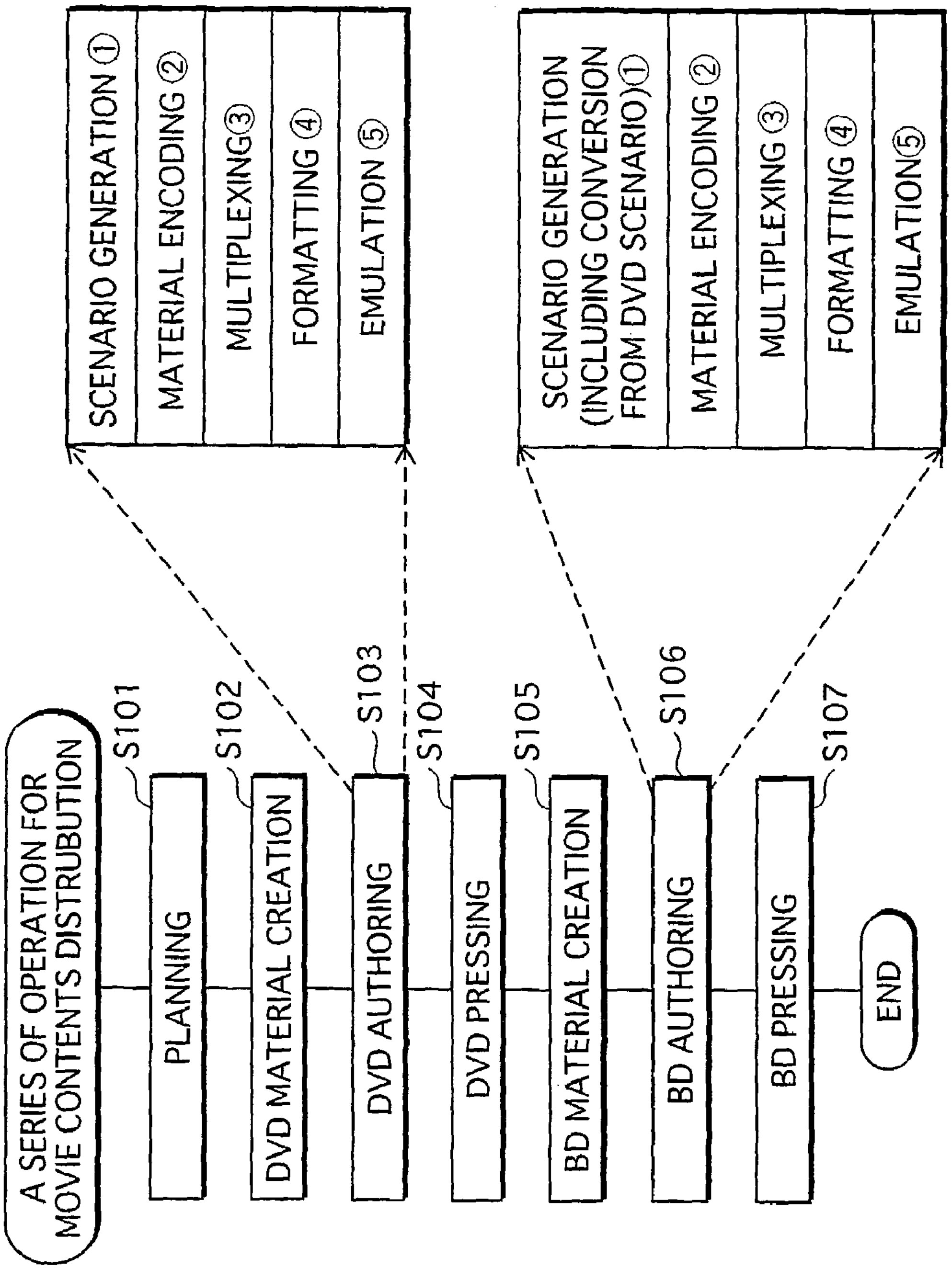
FIG. 1 is a diagram showing the disc production step for movie contents distribution.

First, the production operation of DVD, and BD-ROM used for distributing movie contents is described. FIG. 1 is a diagram showing the production operation for discs used for distributing movie contents. This production operation is comprised of a DVD production process and a BD-ROM production process.

The DVD production process includes a planning step for deciding which scenario is used for playback of the disc (Step S101), a material creation step for performing material creation, such as moving image recording and audio recording (Step S102), an authoring step performed with use of the generating apparatus (Step S103), and a press step for completing the DVD, by generating a master DVD and then performing pressing-bonding (Step S104).

The BD-ROM production process includes a material creation step for performing material creation, such as moving image recording and audio recording (Step S105), an authoring step performed with use of the generating apparatus (Step S106), and a press step for completing the BD-ROM, by generating a master BD-ROM and then performing pressing-bonding (Step S107)

Among these steps, an authoring step targeting a DVD (Step S103) is further comprised of five steps: (1) scenario editing, (2) material encoding, (3) multiplexing, (4) formatting, and (5) emulation.

(1) scenario editing is performed to convert the scenario created in the planning stage, into a format that the DVD playback apparatus can understand. As a result of the scenario editing, a scenario for DVD is generated. In addition, multiplexing parameters and the like that are necessary for performing multiplexing are also generated, as a result of scenario editing.

(2) material encoding is performed to encode each of the video material, audio material, and sub-picture material, respectively into a video stream, an audio stream, and sub-picture data.

(3) multiplexing is performed to interleave multiplex the video stream, the audio stream, and the sub-picture data, that have been obtained as a result of material encoding, so as to convert them into one digital stream.

(4) In formatting, a variety of information is generated, based on a DVD scenario, so as to make the scenario and the digital stream to be in conformity with the DVD format.

(5) In emulation, the result of the authoring is checked for correctness.

Among the aforementioned, a great amount of time is spent for the scenario production, and for the digital stream encoding.

The authoring step (Step S107) targeting a BD-ROM is also comprised of five steps: (1) scenario editing, (2) material encoding, (3) multiplexing, (4) formatting, and (5) emulation. The characteristic of the BD-ROM authoring step of the present embodiment is that the scenario editing is not performed from scratch, and is instead performed by converting the scenario created for the DVDs, to obtain the BD-ROM scenario, thereby saving users time and trouble. The generating apparatus of the present invention is used in this BD-ROM authoring.

Figure 2:
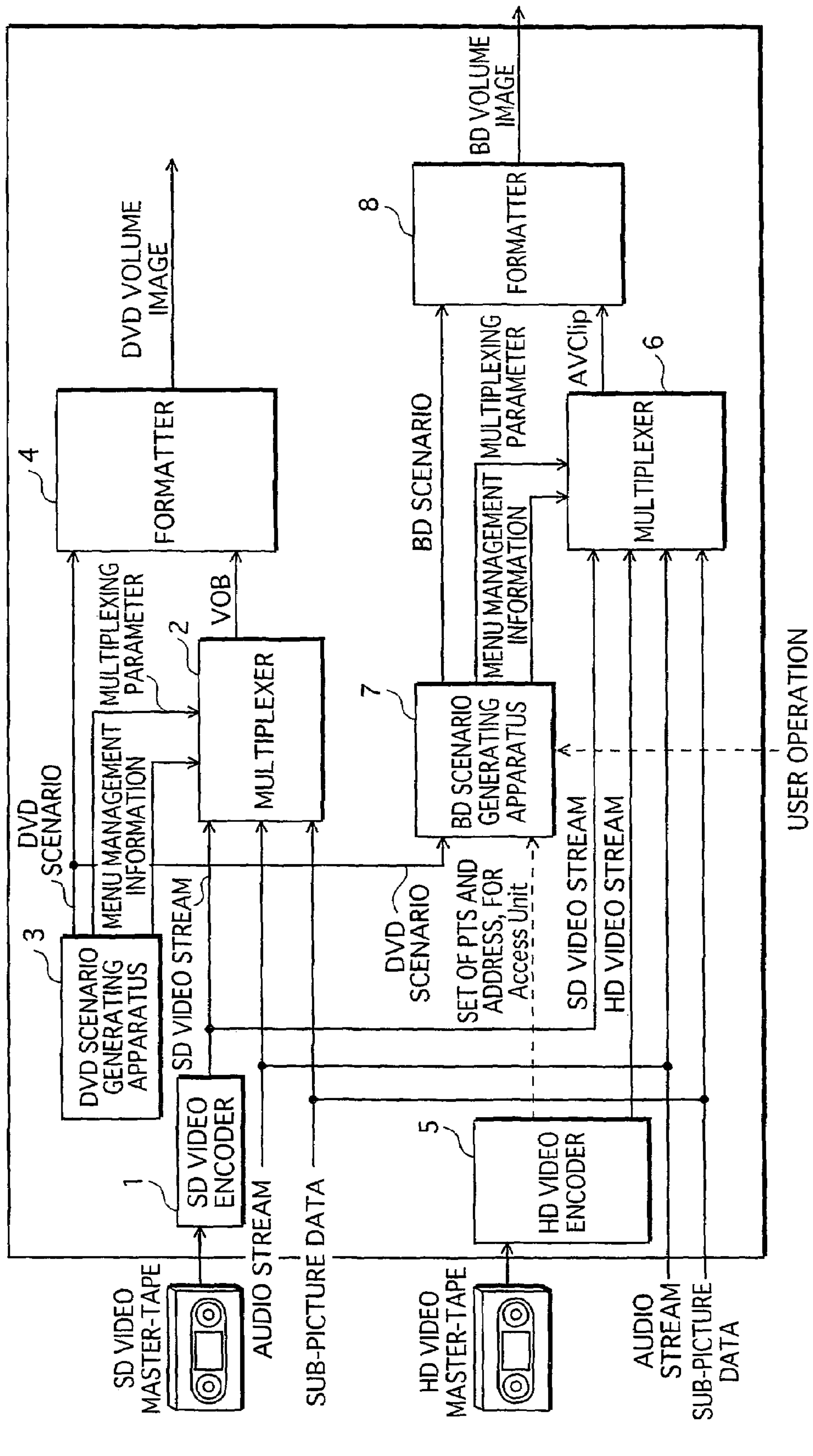
FIG. 2 is a diagram showing the internal structure of the generating apparatus.

FIG. 2 is a diagram showing the internal structure of the generating apparatus. As shown in this drawing, the generating apparatus is made up of an SD video encoder 1, a multiplexer 2, a DVD scenario generating apparatus 3, a formatter 4, an HD video encoder 5, a multiplexer 6, a BD scenario generating apparatus 7, and a formatter 8. Since it is difficult to understand the generating apparatus only from FIG. 2, FIGS. 3-8 are also referred to, in the following description in which the structural elements of the generating apparatus are explained.

<SD Video Encoder 1>

Figure 3:
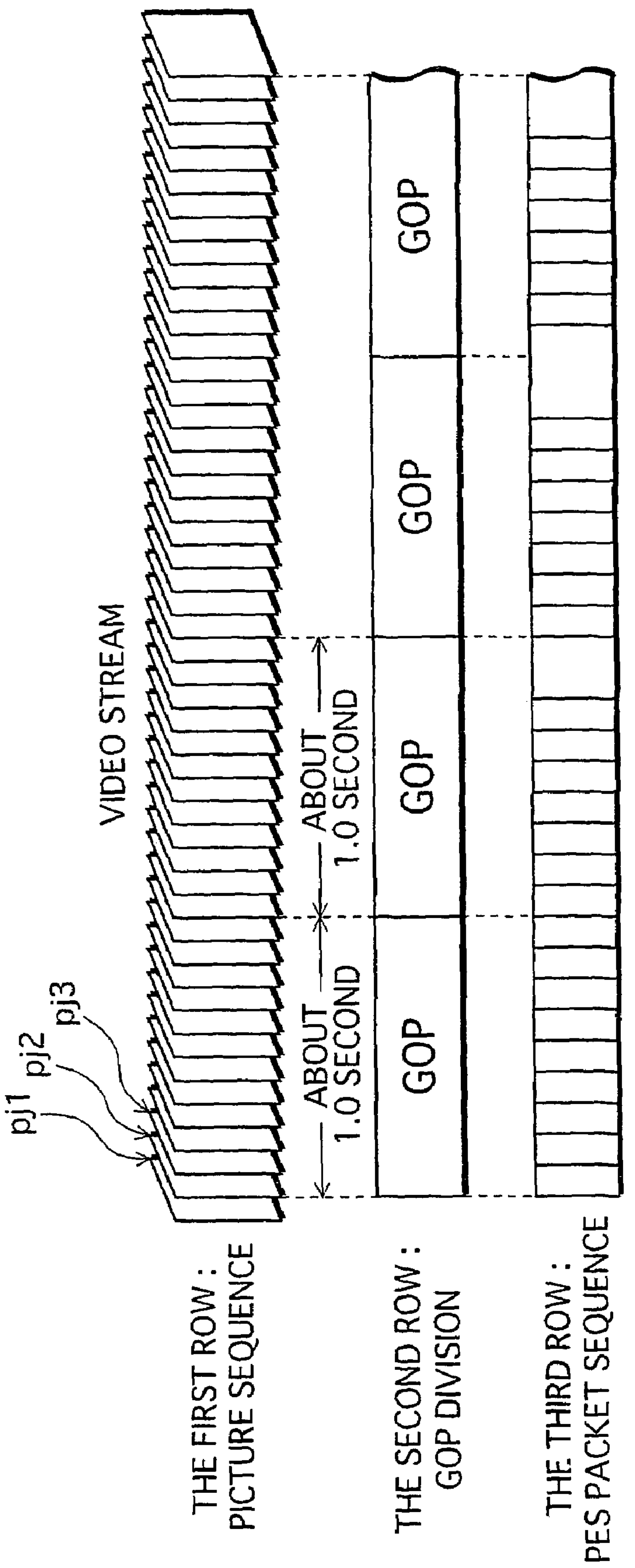
FIG. 3 is a diagram showing the internal structure of the SD-type video stream, having been obtained by the encoding of the SD video encoder 1.

The SD video encoder 1 obtains an SD-type video stream, by encoding a moving image in analogue signal format, which is among the materials constituting a movie content (i.e. moving image, audio, and subtitles). FIG. 3 shows the internal structure of SD-type video stream that the SD video encoder obtains. The video stream situated on the first row of FIG. 3 is divided into a plurality of pieces of picture data which are arranged in a sequence of pj1, 2, 3 . . . . These pieces of picture data are each displayed in a predetermined display period for a display (the display period is sometimes called "video frame"). For a display of NTSC method, the video frame is about 33 msec (more accurately $1/29.97$ sec), whereas for a display of PAL method, the video frame is 40 msec. These pieces of picture data have been subjected to compression and encoding based on inter-frame correlation. Accordingly, the pieces of picture data constituting a video stream are divided into three types: bidirectionally predictive (B) picture, predictive (P) picture, and intra (I) picture. The B picture is compressed using correlation with the image to be played back either before or after the picture. The P picture is compressed using correlation with the image to be played back before the picture. The I picture is compressed using the spatial frequency response for one frame of image, without using correlations with other pictures. The decodable minimum unit of a video stream is called GOP (group of picture). Each GOP includes at least one I picture, and is a collection of pieces of picture data having a playback time of about 0.4-1.0 second. In FIG. 3, the video stream shown in the first row is divided into a plurality of GOPs as in the second row. Because the compression encoding method for picture data is a variable-length method, each GOP has a different data length from one another. The SD video encoder 1 performs an operation for generating such a video stream.

<Multiplexer 2>

Figure 4:
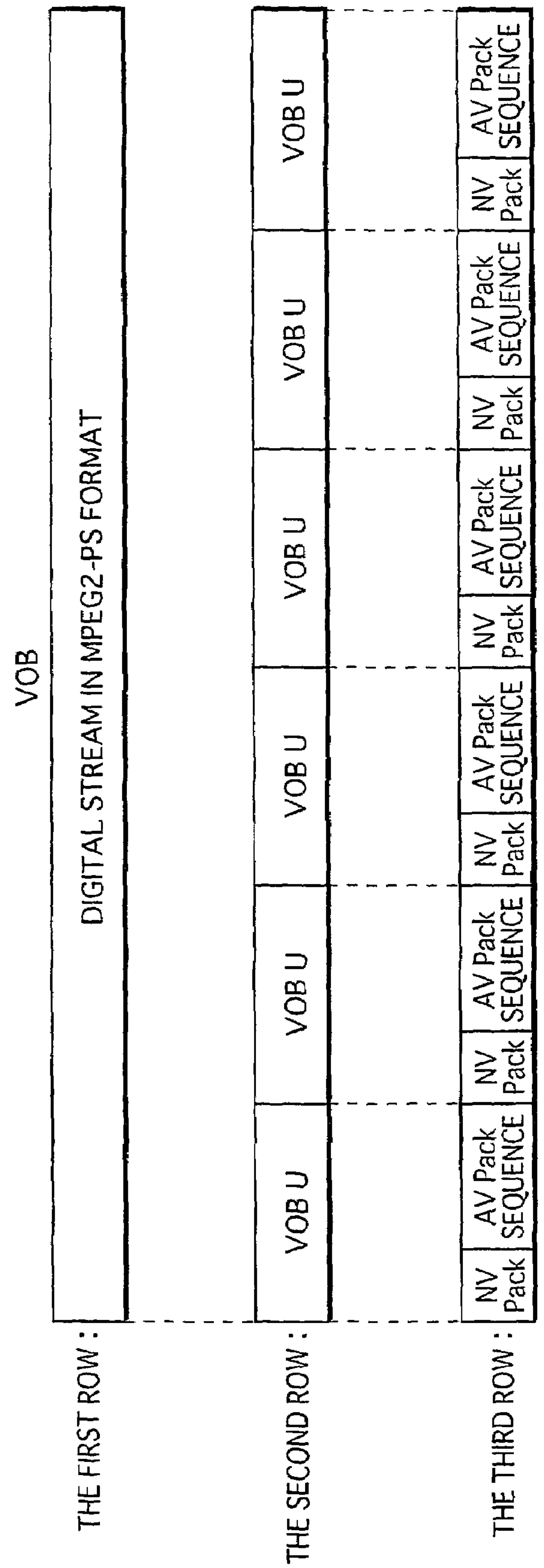
FIG. 4 is a diagram detailing the digital stream recorded on the DVD-Video, in stages.
Figure 5:
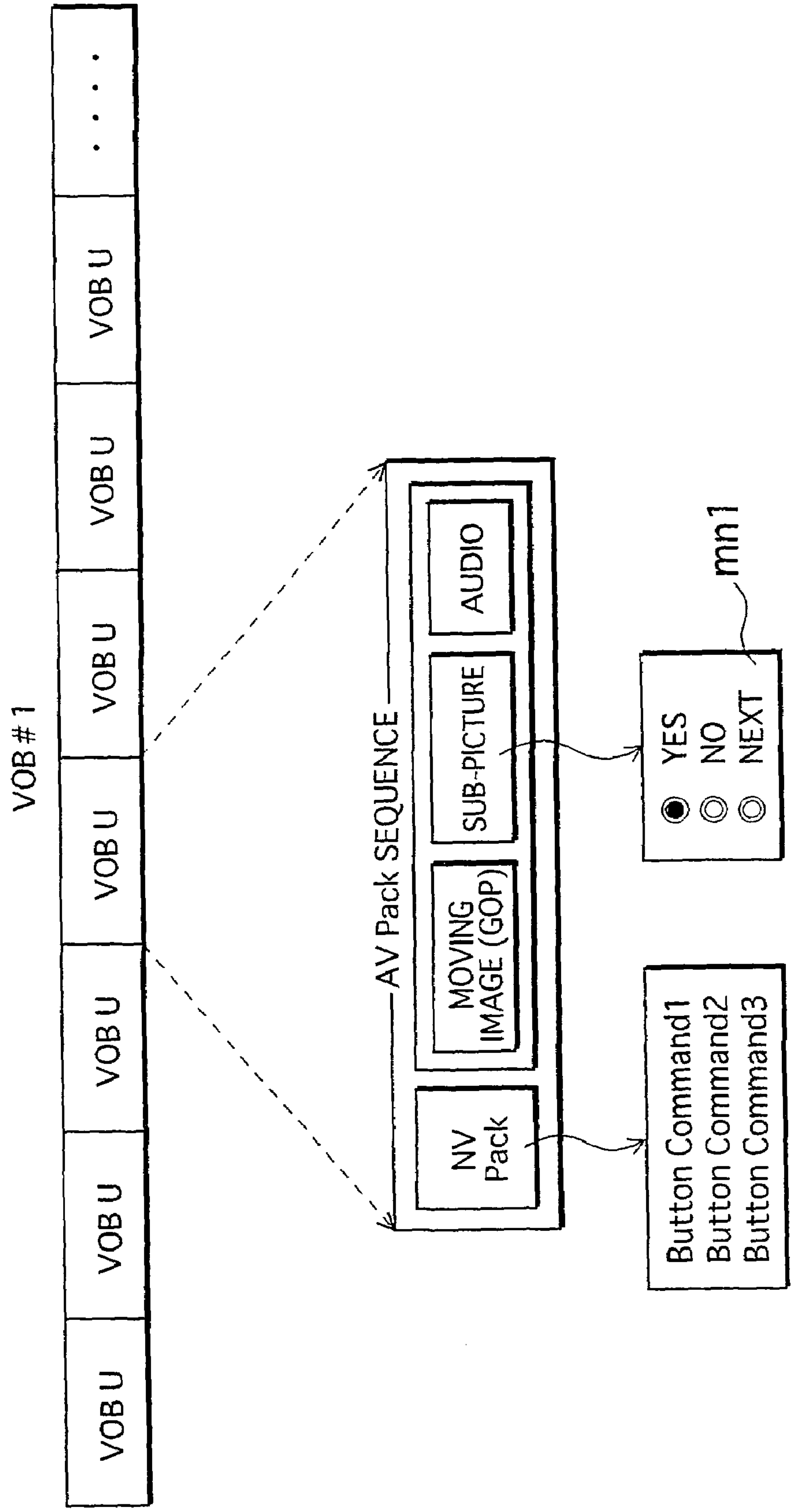
FIG. 5 is a diagram showing the contents of the NV-Pack sequence, and of the AVPack sequence, which have been contained in a VOBU.

The multiplexer 2 multiplexes a plurality of kinds of elementary streams, and so obtains a digital stream in MPEG2-PS (program stream) format. The elementary streams include a video stream, a linear-PCM formatted or Dolby-AC3 formatted audio stream, sub-picture data in run-length format, and menu management information. The multiplexer 2 obtains a digital stream in MPEG2-PS format by multiplexing the elementary streams according to the multiplexing parameters given by the DVD scenario generating apparatus 3. The following describes the details of the digital stream generated by the multiplexer 2, with reference to FIG. 4. FIG. 4 is a diagram detailing, in stages, the structure of the digital stream to be recorded on the DVD-Video. In this drawing, the first row shows the digital stream to be recorded on the DVD-Video. This digital stream is in MPEG2-PS format, and is called a VOB (video object). The VOB is comprised of a plurality of VOBUs, as shown in the second row. The VOBU is the smallest decodable unit of VOB. The VOB can be random accessed at the beginning of each VOBU. This is because the VOBU includes therein a GOP of a video stream. Each VOBU is composed of an NV-Pack located at the beginning, and a subsequent AVPack sequence. FIG. 5 is a diagram detailing the content of the NV-Pack and the AVPack sequence, within the VOBU. As aforementioned, the AVPack sequence includes a moving image which is a GOP, and also includes a sub-picture and audio that are to be read out together with this moving image by a playback apparatus. If the sub-picture included in the VOBU represents a menu to be displayed during playback of the moving image (i.e. mn1 in the drawing), the NV-Pack stores therein a command (button command) to be executed when the button of this menu is pushed. The menu management information is information describing controls directed to a menu, such as button commands, and some of the button commands are stored in the NV-Pack, thereby realizing the interactive operation.

Figure 6:
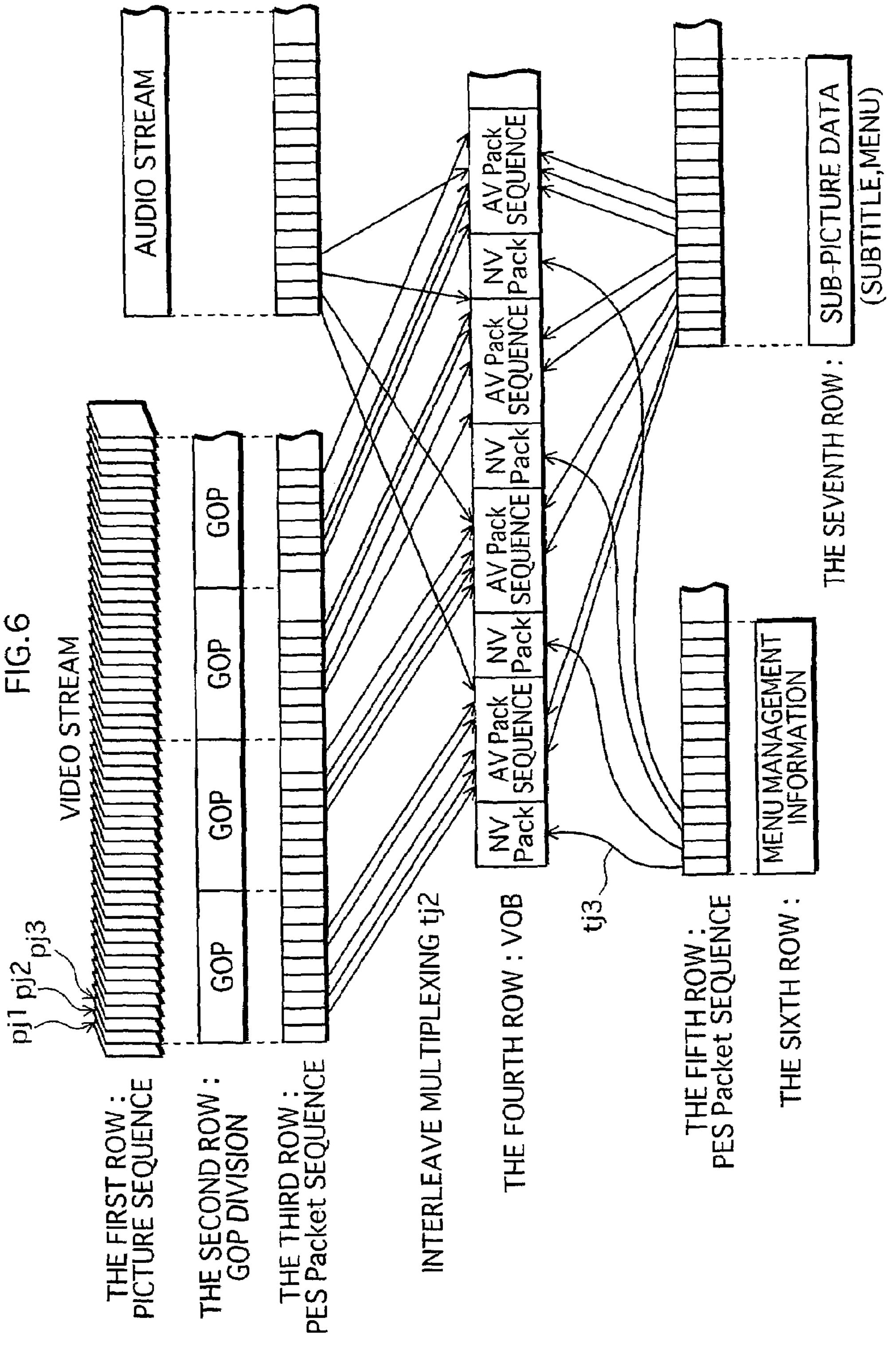
FIG. 6 is a diagram showing how to generate an AVPack sequence constituting a VOBU.

The following describes how the multiplexer 2 generates an AVPack sequence constituting a VOBU, with reference to FIG. 6. As shown in this drawing, the multiplexer 2 obtains an AVPack sequence, by multiplexing: a video stream and an audio stream that are shown in the first row; the menu management information shown in the sixth row; and the sub-picture data shown in the seventh row.

The video stream of the first row and the GOP of the second row are the same as those shown in FIG. 3. The GOP of the second row is divided by the multiplexer 2, so as to be stored in the PES (packetized elementary stream) packet sequence shown in the third row. On the other hand, the audio stream situated at the right hand side of the first row is also divided by the multiplexer 2 into pieces, and the pieces obtained by the division is each stored in the PES packet sequence shown in the third row. The same thing applies to the menu management information and the sub-picture data that are respectively shown in the sixth and seventh rows. The multiplexer 2 divides the PES packet sequence, in which each GOP is stored, into a plurality of pieces. The multiplexer 2 then performs interleave multiplexing (tj2, tj3) on the pieces with PES packets respectively constituting an audio stream, menu management information, and sub-picture data, so as to constitute the AV pack sequence shown in the fourth row. Since each VOBU includes a GOP of the video stream, it is to be played back independently.

Figure 7:
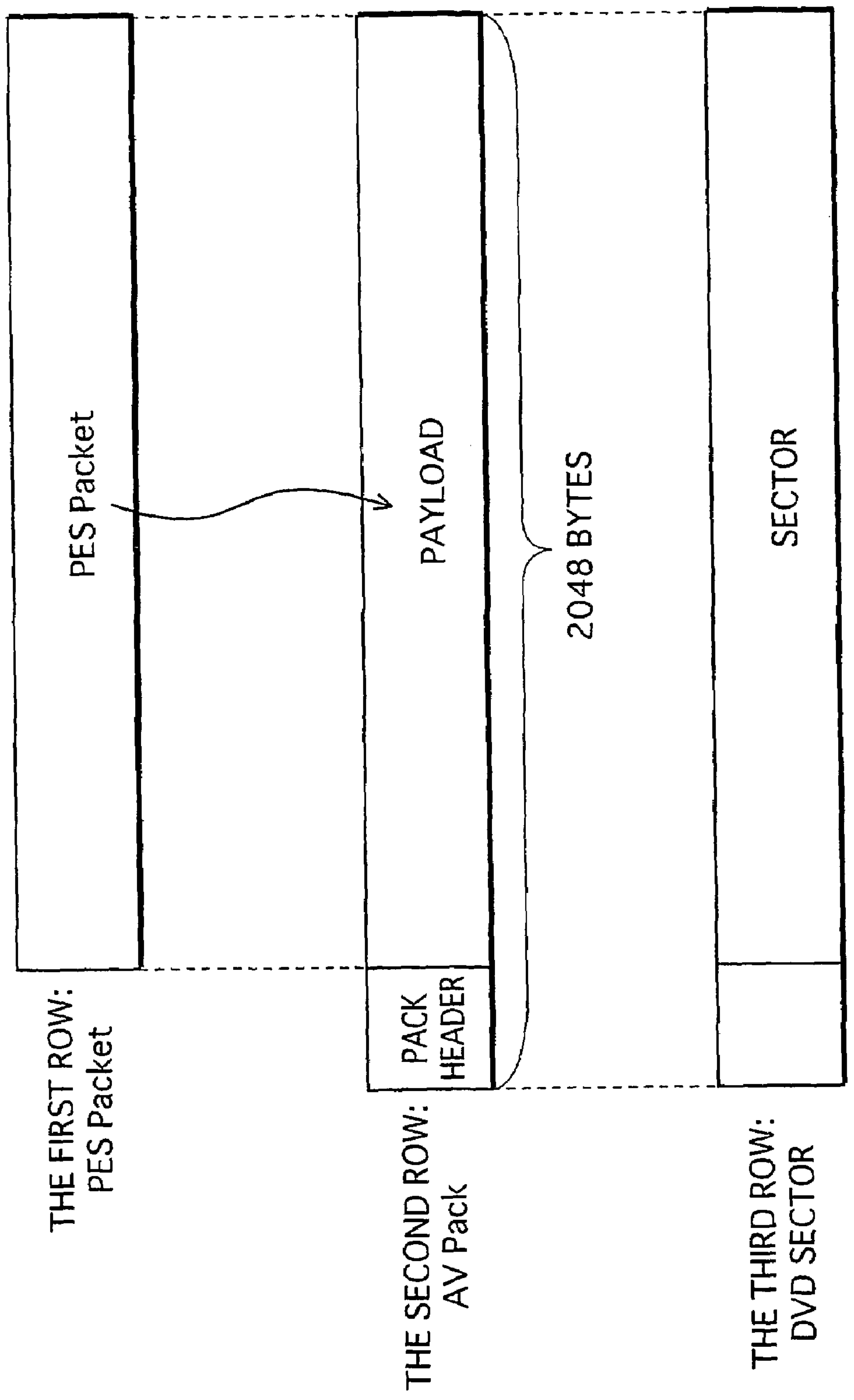
FIG. 7 is a diagram showing the relation between the PES packet and the AV pack.

FIG. 7 is a diagram showing the relation between PES packets and AV packs. As shown in the second row, an AV pack has a size of 2048 bytes, and is composed of a pack header and a payload. This payload stores therein a PES packet. For the pack header, the SCR (system clock reference) is set that shows a time at which this AV pack is inputted into the apparatus buffer. The size of the AV pack which is 2048 bytes coincides with the size of 1 sector of the DVD-Video. When being stored, the AV packs are stored in the sectors of the DVD-Video in one-to-one relation. The operation performed by the multiplexer 2 is to perform the multiplexing shown in FIG. 6, based on the menu management information and the multiplexing parameter that the multiplexer 2 has generated.

<DVD Scenario Generating Apparatus 3>

The DVD scenario generating apparatus 3, according to a user operation, generates a scenario, and outputs the generated scenario to the formatter 4. In addition, the DVD scenario generating apparatus 3 generates a multiplexing parameter, and outputs it to the multiplexer 2, thereby controlling the multiplexing performed by the multiplexer 2. Here, the scenario is information having the playback apparatus to play back the digital stream in a unit of “title”. In DVD, information such as VideoManager and VTS information is the scenario. The title is a playback unit that corresponds to a movie content, in a read-only disc. The relation between a movie content and a title is the same as the relation between a movie content and each of its version. That is, for a movie content that has only one version, the relation “movie content title” holds. If a movie content has several versions such as a theater version, a director’s cut version, and a television broadcast version, each version of the movie contents constitutes one title. One title is composed of at least one digital stream, and the corresponding number of playback control information. The DVD scenario generating apparatus 3 generates scenarios so that the playback is performed title by title.

<Formatter 4>

Figure 8:
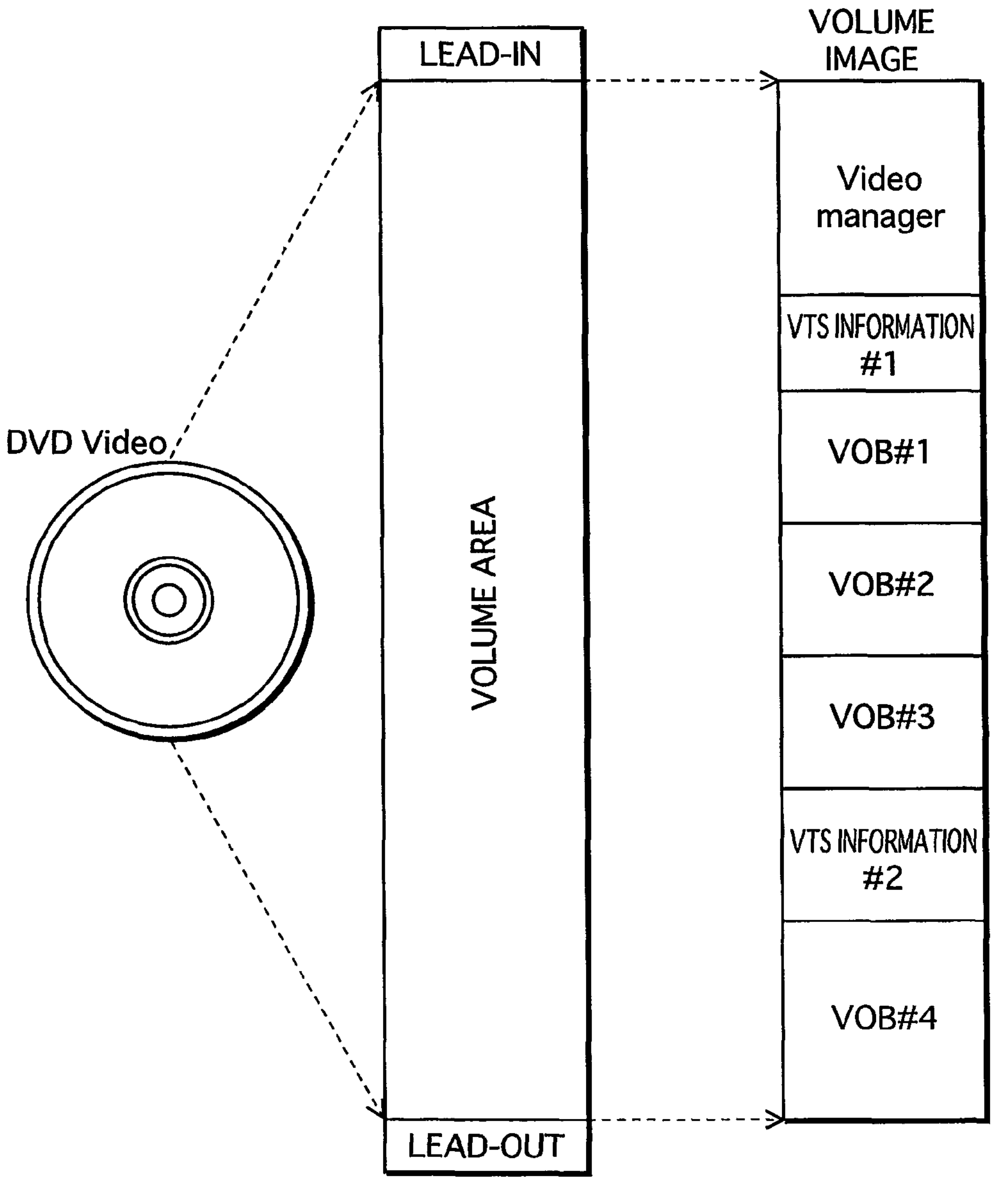
FIG. 8 is a diagram showing the relation between the scenario generated by the DVD scenario generating apparatus 3, and the DVD-Video.

The formatter 4 generates a volume image, by allocating playback control information and each digital stream that have been generated by the multiplexer 2, to the addresses for the track formed from the inner radius to the outer radius of the DVD-Video. FIG. 8 is a diagram showing the relation between the scenario generated by the DVD scenario generating apparatus 3, and the DVD-Video. At the far-left portion of the diagram, DVD-Video is depicted, and the track of the DVD-Video is shown in the middle. At the far-right portion of the diagram, the volume image is depicted. In the middle of the diagram, the track formed in a spiral form on the DVD-Video from the inner radius to the outer radius, is extended in a longitudinal direction. This track is made up of a lead-in area, a volume area, and a lead-out area. In this volume area, the volume image is recorded. At the far-right portion, the Video Manager and the VTS information #1, #2 are scenarios; and the VOB#1, the VOB#2, and the VOB#3 are digital streams generated by the multiplexer 2. The operation of the formatter 4 is to generates a volume image by allocating these to the volume area.

From the SD video encoder 1 to the formatter 4, having been aforementioned, are the structural elements necessary for generating a volume image for DVD-Video. Note that the authoring technology directed to the DVD-Video is disclosed in several documents, such as the international patent publications WO97/13363, and WO97/13364. Therefore, please refer to these documents for more details. The following describes the structural elements used for generating a volume image directed to BD-ROM.

<HD Video Encoder 5>

The HD video encoder 5 obtains a video stream by encoding the moving image recorded on an HD video master tape. The encoding by the HD video encoder 5 is different from the encoding by the SD video encoder 1 in the allocation bit rate used in encoding. That is, the HD video encoder 5 allocates a bit rate of more than 10 Mbps per 1 second of moving image, so as to generate a video stream of high quality that can compare to the high-definition image.

<Multiplexer 6>

Figure 9:
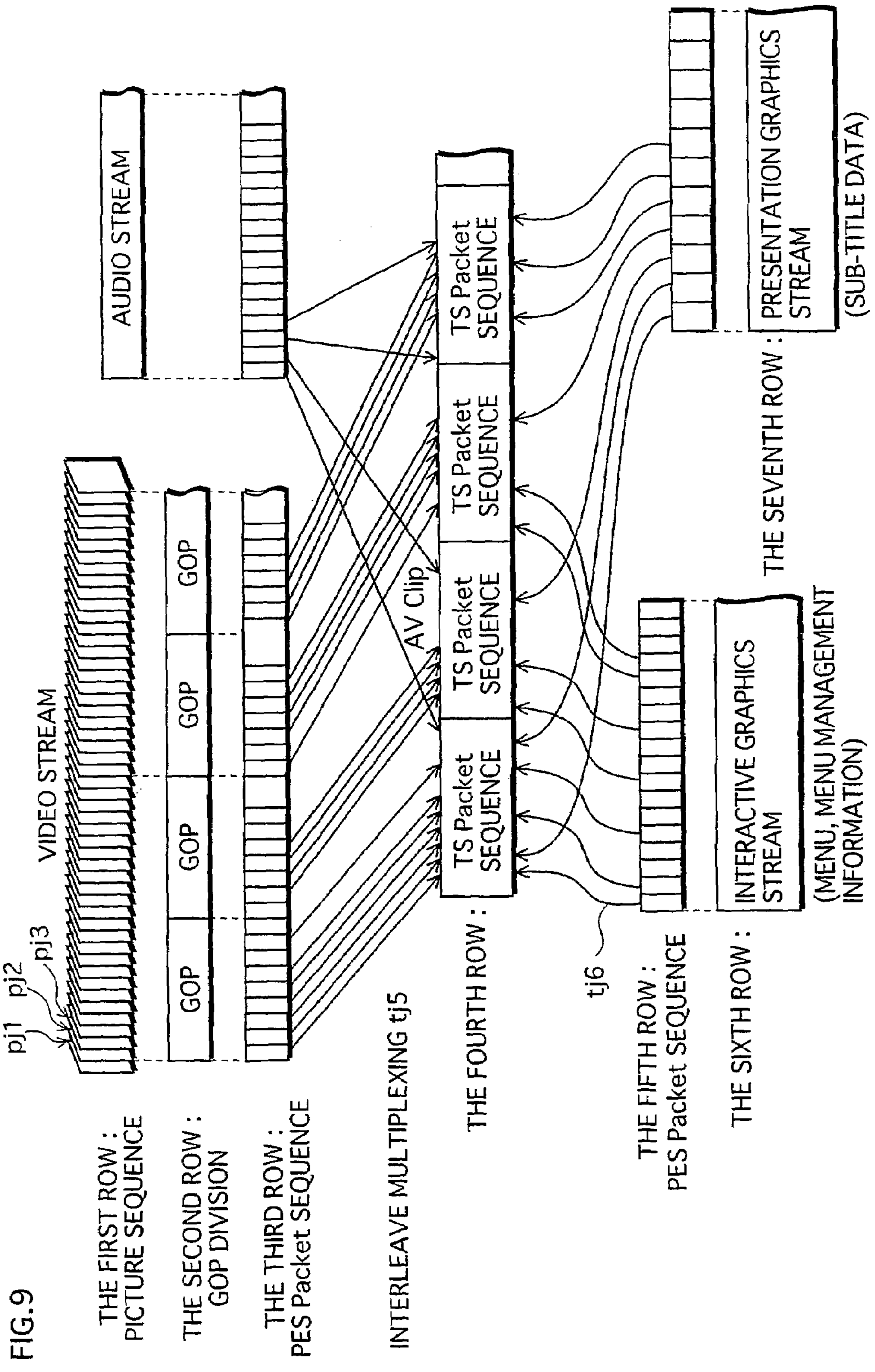
FIG. 9 is a diagram showing the process in which the multiplexer 6 generates the TS packet sequence.
Figure 11:
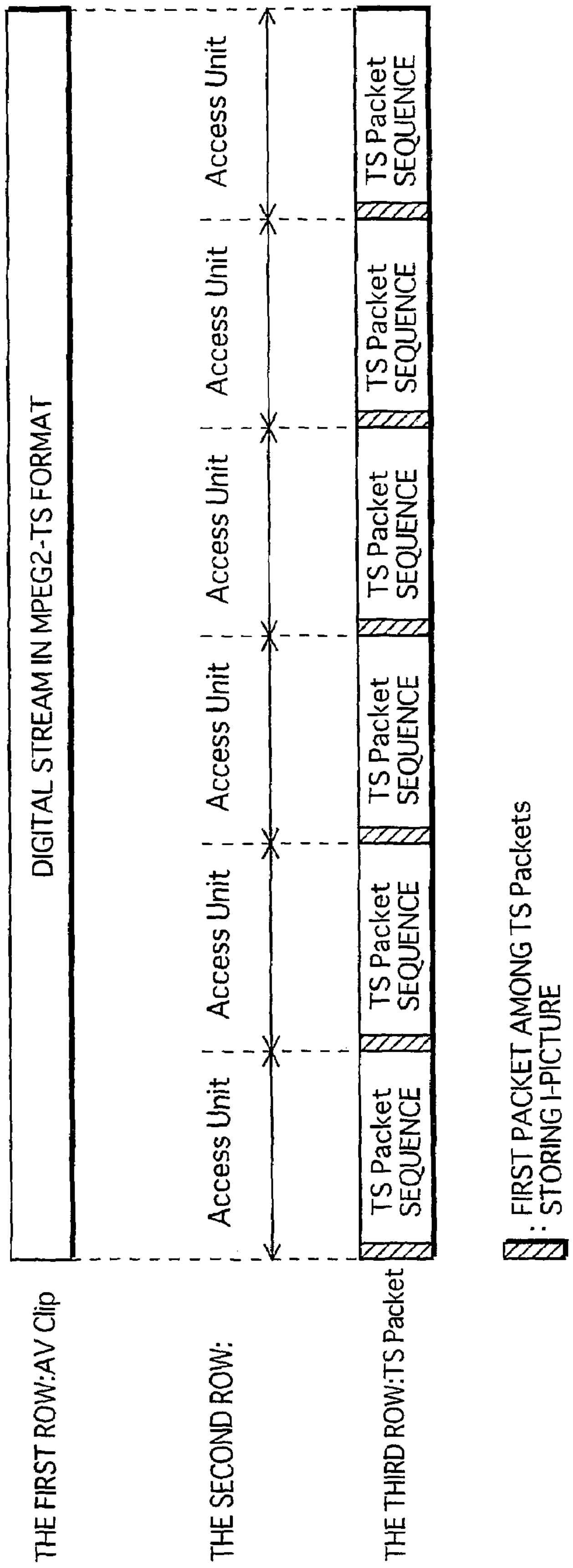
FIG. 11 is a diagram detailing the structure of the digital stream to be recorded on the BD-ROM, in stages.

The multiplexer 6 multiplexes a plurality of kinds of elementary streams, and so obtains a digital stream in MPEG2-TS format. The elementary streams include a video stream that has been generated by either the SD encoder 1 or the HD video encoder 5, an audio stream, sub-picture data, and menu management information. The multiplexer 6 obtains a digital stream in MPEG2-TS format by multiplexing these elementary streams according to the multiplexing parameters given by the DVD scenario generating apparatus 7. The following describes how the multiplexer 6 generates the digital stream. FIG. 11 is a diagram detailing, in stages, the structure of the digital stream to be recorded on the BD-ROM. In this drawing, the first row shows the digital stream to be recorded on the BD-ROM, just as in FIG. 4. This digital stream is in MPEG2-TS format, and is called an AVClip. FIG. 9 is a diagram showing the process in which the multiplexer 6 generates a TS packet sequence. In FIG. 9, the first to third rows, the fifth to sixth rows are the same as those in FIG. 4, and each show a picture sequence, GOP division, and a PES packet sequence. Whereas the fourth row and the seventh row are greatly different from those in FIG. 4. That is, as shown in the fourth row, the multiplexer 6 multiplexes a PES packet sequence in which a GOP sequence is stored, with a PES packet sequence in which an audio stream, an interactive graphics stream, and a presentation graphics stream are stored, (tj1, ti2 of the drawing), so as to generate a TS packet sequence. The interactive graphics stream is a stream in which graphics data used for interactive control is stored, and the presentation graphics stream is a stream used for subtitle display.

To summarize, in BD-ROM, information for controlling a menu constitutes a functional segment called "ICS", and is stored in the graphics stream, whereas in DVD, such information is stored in NV-Pack.

Here, it should be noted that the maximum number of audio streams that can be multiplexed in a DVD is 8. However in a BD-ROM, the maximum number of such is 32. In view of this, it is desirable to remind users that even after generation of a volume image for BD from a volume image for DVD, at least 24 more audio streams can be multiplexed in the BD.

Figure 10:
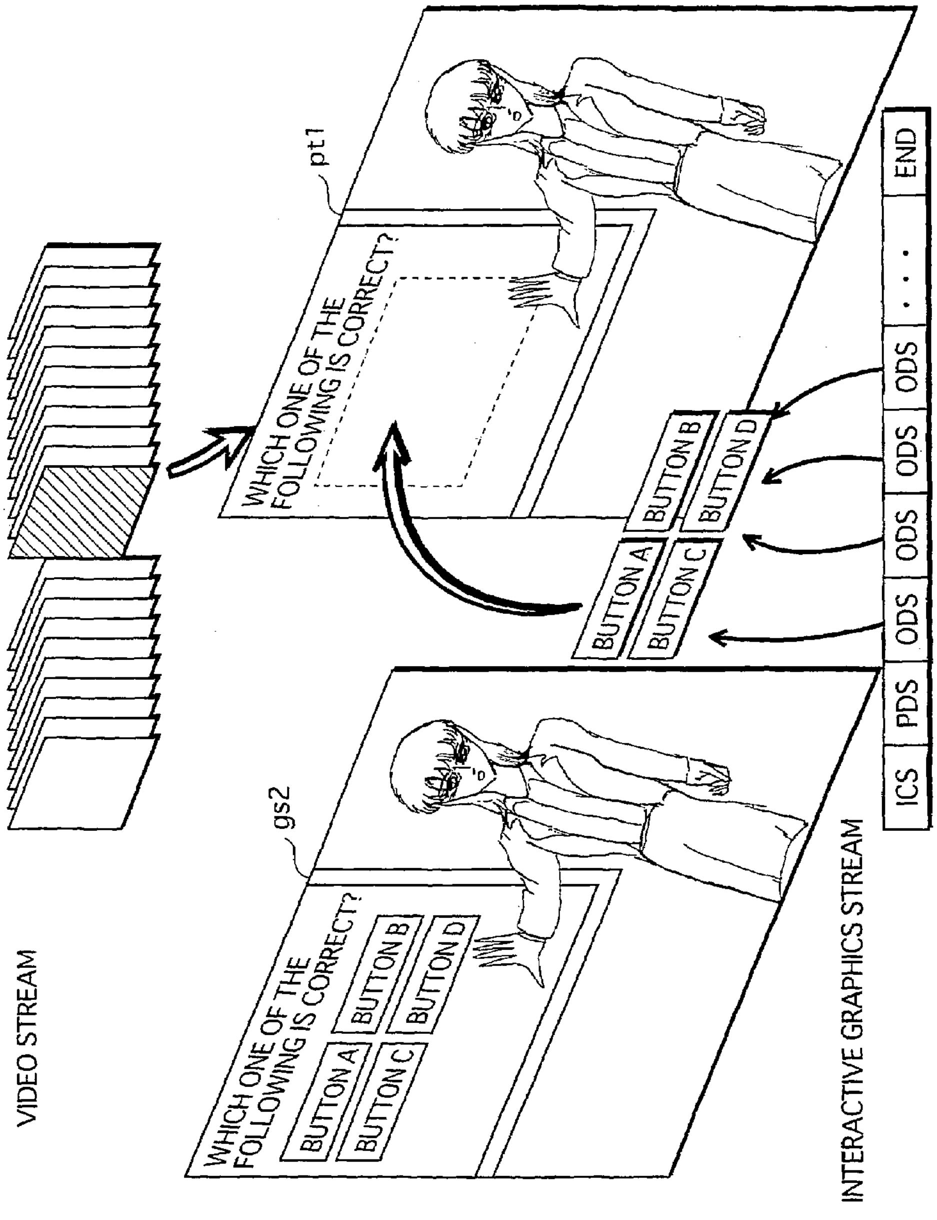
FIG. 10 shows one example of interactive graphics stream.

FIG. 10 shows one example of interactive graphics stream. The interactive graphics stream is a stream made by integrating: graphics data constituting button images; and menu control information used for button control. The interactive graphics stream is made up of a plurality of segments, and each of the segments is one of: ICS (Interactive Control Segment) which is menu control information; PDS (Palette Define Segment) for defining colors of a menu; and ODS (Object Define Segment) which is graphics that represents buttons in the menu. One set of these segments is stored in one PES packet, and the DTS (Decode Time Stamp) and PTS (Presentation Time Stamp) of this PES packet define a control timing and a reproduction timing. According to such timing definition, the instant that an arbitrary picture among the moving images is displayed (pt1), an interactive screen made of a plurality of buttons can be combined with picture data (gs2) right away. By this, the interactive graphics stream realizes interactive control directed to a plurality of buttons, in accordance with the contents of the moving images. As is understood from above, BD-ROM does not necessitate NV-Pack for realizing interactive control.

The above explanation was about the structure of AVClip of BD-ROM. Next, the difference between AVClip and VOB is described. In BD-ROM, there is no NV-Pack for storing menu control information. Since there is no NV-Pack, BD-ROM does not have a unit corresponding to VOBU. Instead, in AVClip, the first packet of the TS packets storing I picture is treated as a point at which random-access can be performed (a random-access point). In addition, from one of such points to another is referred to as "Access Unit". FIG. 11 shows one example of such Access Unit.

Figure 12:
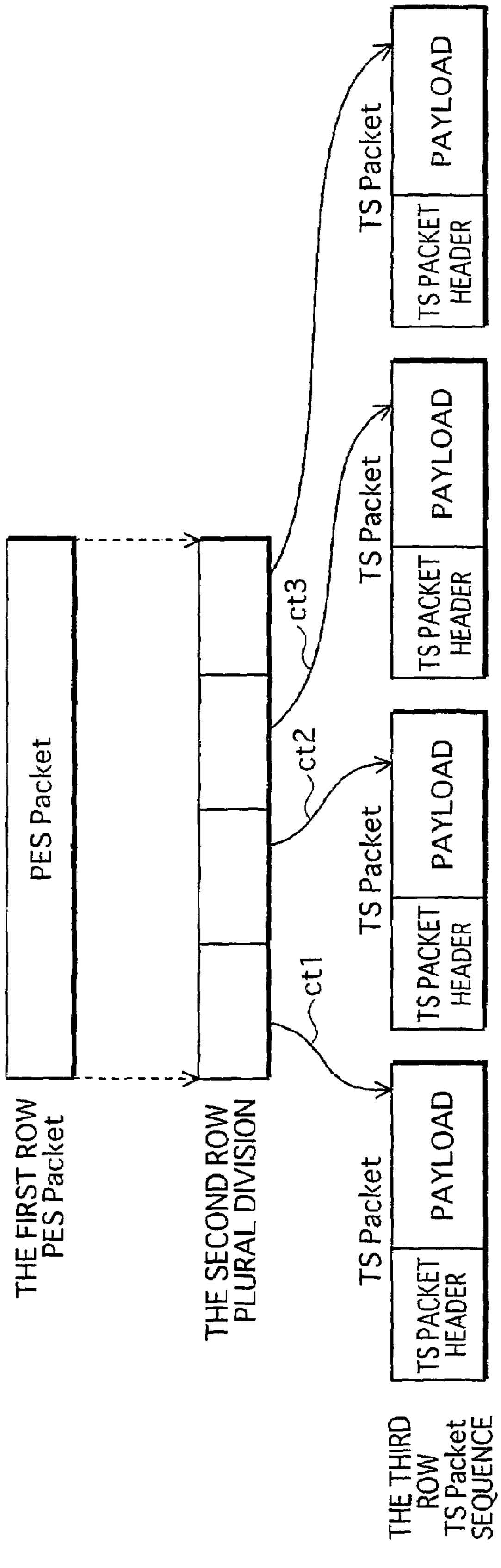
FIG. 12 is a diagram showing the internal structure of a TS packet.

Next, the internal structure of a TS packet is described. In the third row of FIG. 12, the structure of a TS packet is shown. The TS packet shown in the third row of FIG. 12 is comprised of "TS packet header", and "payload unit", and has a size of 188 bytes. The payload stores therein divided parts resulting from dividing a PES packet into a plurality of parts. As shown by the arrows ct1, 2, and 3, the divided parts are stored in the payload of the TS packet of the third row. The operation of the multiplexer 6 is to perform multiplexing shown in FIG. 12, and so to generate a TS packet sequence. In generation of a volume image for BD-ROM, the digital stream recorded on the DVD-Video in advance must not be used, and a new digital stream has to be obtained by the re-encoding of the multiplexer 6. This is because the digital stream for BD-ROM should be in MPEG2-TS format, and therefore the digital stream for DVD-Video which is in MPEG2-PS format cannot be used as it is. Here, the new digital stream is generated in the above explanation. However, when the BD playback apparatus has the ability of playing back digital streams for DVD, the digital stream having been generated originally for DVD may be used as it is.

<BD Scenario Generating Apparatus 7>

The BD scenario generating apparatus 7, according to a user operation, generates a scenario for BD-ROM and outputs the scenario to the formatter 8. In addition, the BD scenario generating apparatus 7 generates a multiplexing parameter, and outputs it to the formatter 8, thereby controlling the multiplexing performed by the multiplexer 6. The scenario generated by the BD scenario generating apparatus 7 is made up of Index Table, Movie Object, PlayList, and Clip information. Since the present BD scenario generating apparatus 7 is the core of the generating apparatus, it may be implemented as a system LSI. Alternatively, the BD scenario generating apparatus 7 may be implemented as a form of dedicated software installed in a personal computer.

<Formatter 8>

Figure 13:
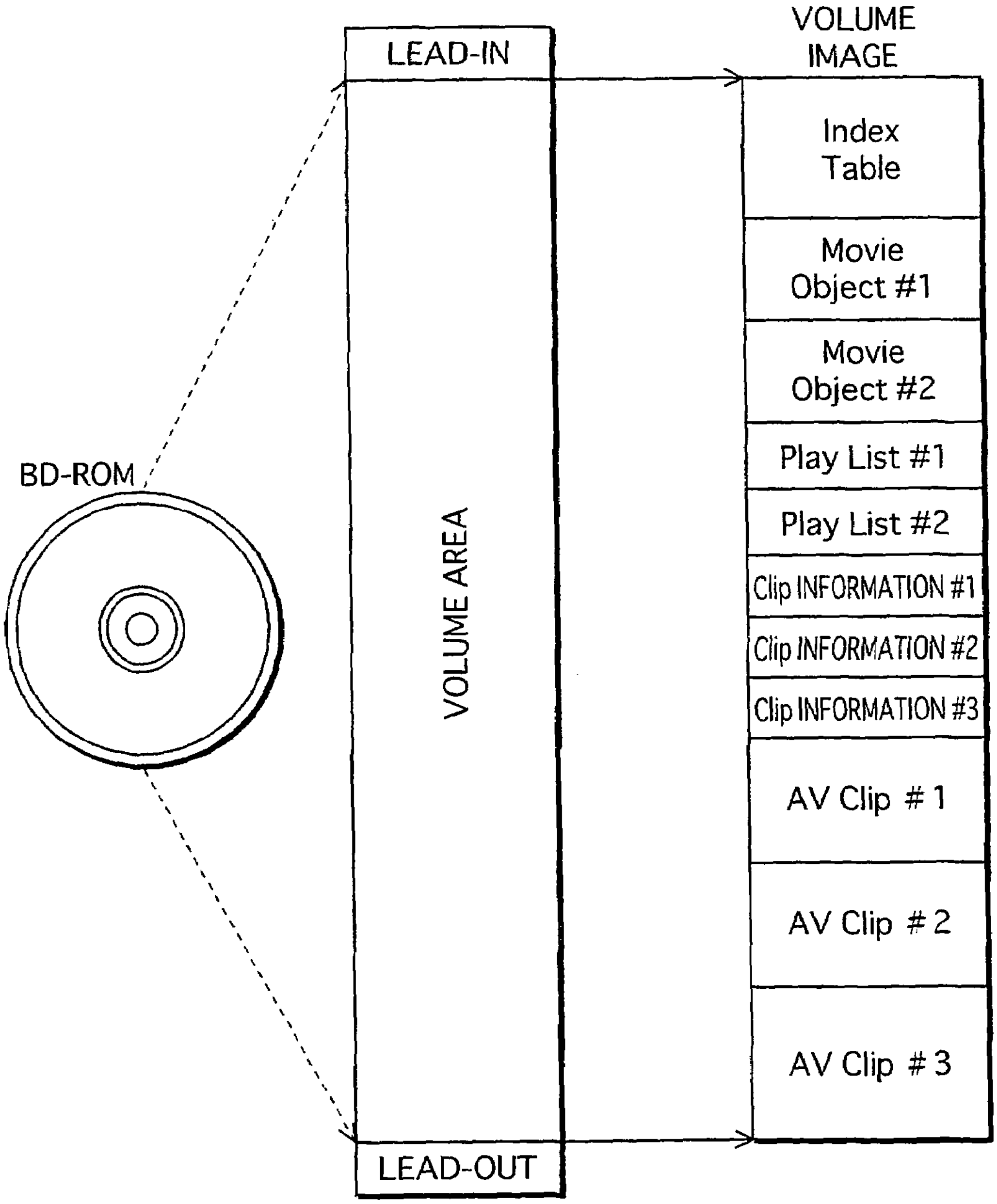
FIG. 13 is a diagram showing the relation between the scenario generated by the BD scenario generating apparatus 7, and the volume image.

The formatter 8 generates a volume image, by allocating the addresses for the track formed from the inner radius to the outer radius of the BD-ROM, to play back control information and each digital stream that has been generated by the BD scenario generating apparatus 7. FIG. 13 is a diagram showing the relation between the scenario generated by the BD scenario generating apparatus 7, and the volume image. At the far-left portion of the diagram, the BD-ROM is depicted, and the track of the BD-ROM is shown in the middle. The track in the middle of the diagram is made up of a lead-in area, a volume area, and a lead-out area. In this volume area, the volume image is recorded. At the far-right portion, Index Table, Movie Object #1, #2, Play List #1, #2, Clip information #1, #2, #3 are scenarios, and are generated by the BD scenario generating apparatus 7. The operation of the formatter 8 is to generate a volume image by allocating thus generated scenarios and the AVClip#1, #2, #3 that is generated by the multiplexer 6, to the addresses of the BD-ROM.

The above are the structural elements of the generating apparatus depicted in FIG. 2.

Figure 14:
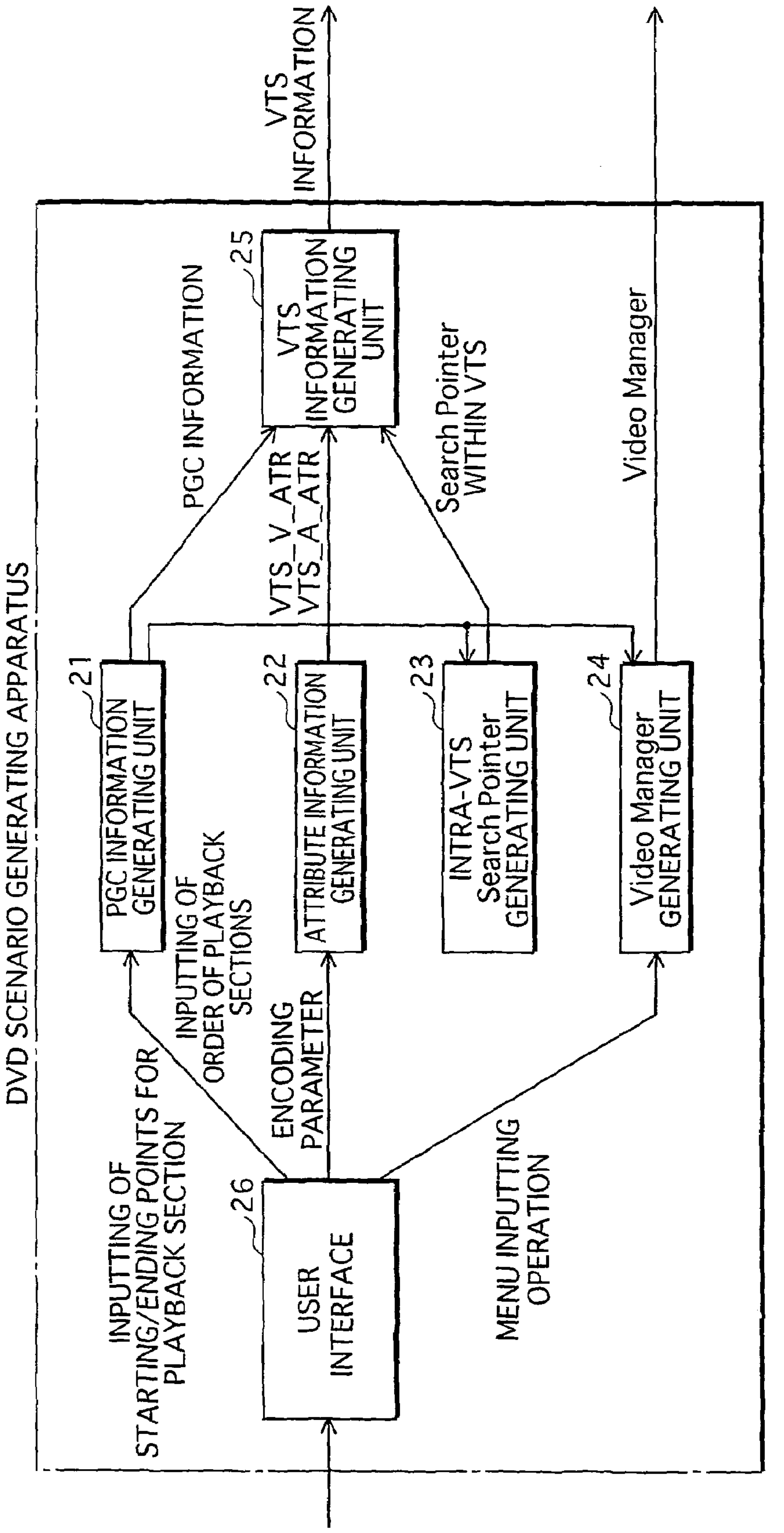
FIG. 14 is a diagram functionally showing the internal structure of the DVD scenario generating apparatus 3.
Figure 15:
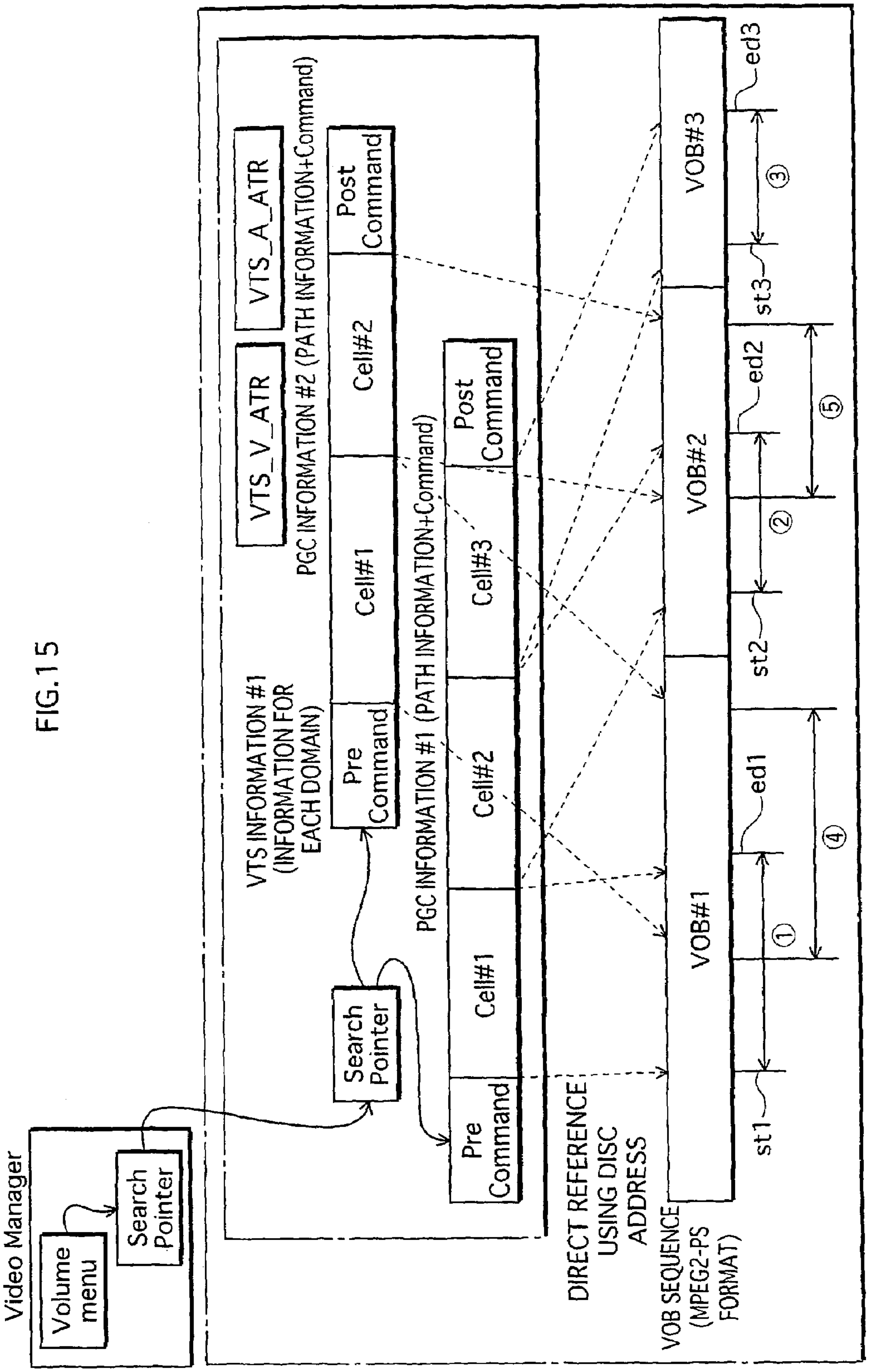
FIG. 15 is a diagram showing the relation between VOB and PGC information in DVD-Video.
Figure 16:
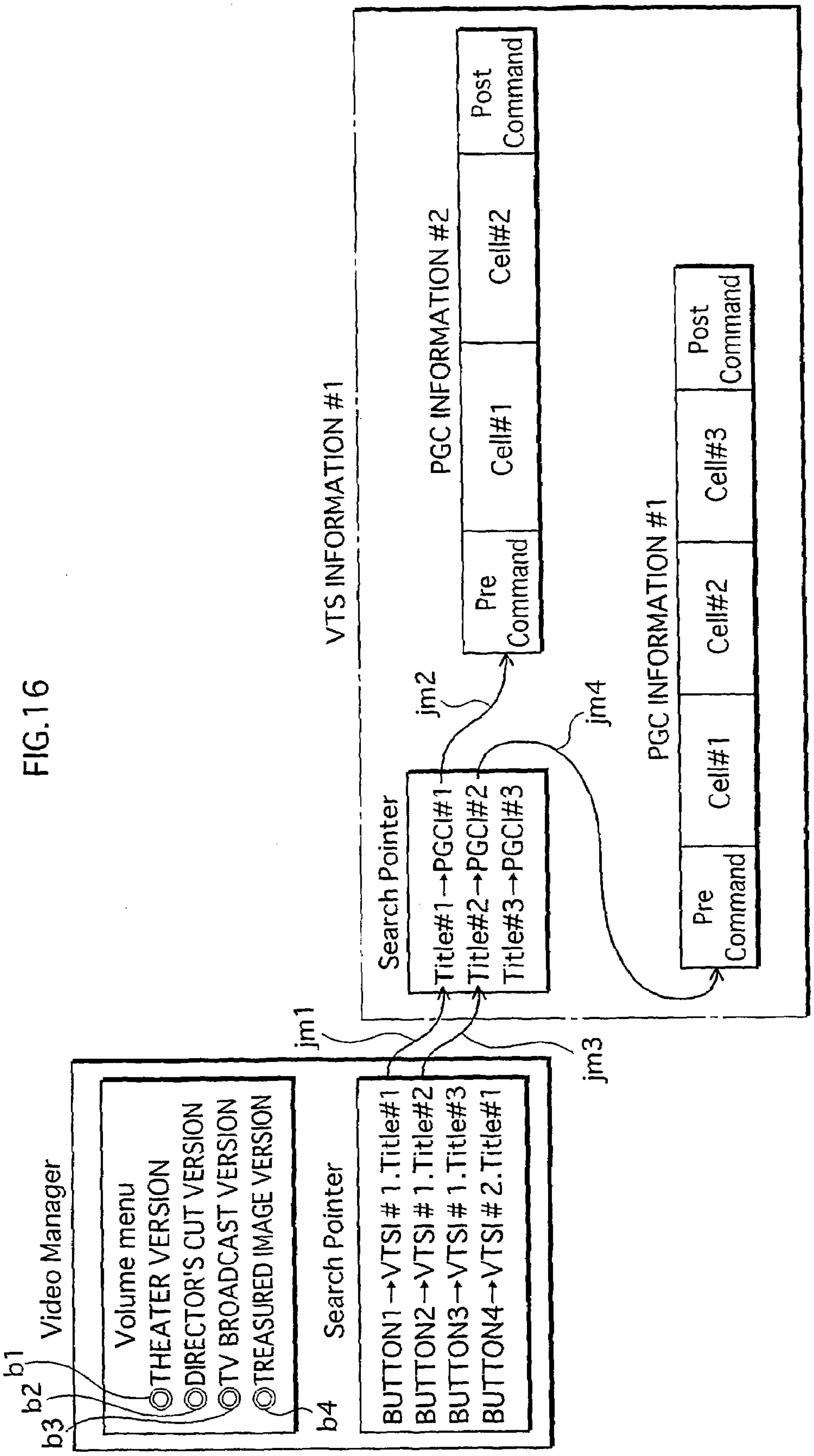
FIG. 16 is a diagram showing the correspondence between VTS_TT and PGC information.

Next, the DVD scenario generating apparatus 3 is described in greater detail. The DVD scenario generating apparatus 3 realizes its function, by making a computer read a program for execution. FIG. 14 is a diagram functionally showing the internal structure of the DVD scenario generating apparatus 3. As shown in this drawing, the DVD scenario generating apparatus 3 includes a PGC information generating unit 21, an attribute information generating unit 22, an intra-VTS Search Pointer generating unit 23, a Video Manager generating unit 24, a VTS information generating unit 25, and a user interface 26. Since it is difficult to understand this DVD scenario generating apparatus 3 only from FIG. 14, FIGS. 15-16 are also referred to, in the following description in which the structural elements of the DVD scenario generating apparatus 3 are explained.

<PGC Information Generating Unit 21>

The PGC information generating unit 21 is a part of the DVD scenario generating apparatus 3, and generates PGC information which is the playback control information for the DVD, according to the interactive operation with a user. As follows, the PGC information generated by the PGC information generating unit 21 is described, with reference to FIG. 15. FIG. 15 is a diagram showing the relation between PGC information in the DVD-Video, and a VOB. In this drawing, each of VOB#1, VOB#2, and VOB#3 is a digital stream. PGC information #1, #2 are each playback control information. The playback control information includes path information specifying a logical playback path for the digital stream, and commands to be executed before and after this playback path. The playback path is created by arranging playback sections in accordance with the playback order. In the VOB#1-VOB#3, the sections indicated by (1) (2) (3) are the logical playback sections. In this drawing, the starting points of these playback sections are directly indicated by the logical addresses on the disc. In addition, the lengths of the playback sections (i.e. length of each of (1) (2) (3)) are indicated by the playback time lengths. The broken arrow signs in this drawing symbolically show direct reference to the playback sections determined by the disc addresses. The cell sequences (i.e. Cell #1, Cell #2, Cell #3) specifying the logical playback sections (1) (2) (3) (4) (5), which the disc address directly refers to, are the path information of the DVD-Video. Cell #1, Cell #2, and Cell #3 in the PGC information #1 specify the playback paths (1) (2) (3), and Cell #1, Cell #2 of the PGC information #2 specify playback paths (4) (5). This means that varieties of playback paths are determined which each have their own playback path. By making the Clip information generating unit 11 determine varieties of playback paths, a plurality of versions are accordingly determined for one movie content. Note here that "Pre Command", and "Post Command" that each situate before and after these cells, are commands to be executed for the playback control information.

The definition for the aforementioned PGC information is performed by the following: position-deciding operation for deciding the starting position and the ending position of the playback section, during playback of the digital stream; and order-assign operation for assigning a playback order for each cell, which is performed upon receiving a user operation by the PGC information generating unit 21 through the GUI. The reason why interactive operation with use of GUI is performed is because the PGC information is important information for deciding the scene development of the title, which largely affects the quality of the title, and so requires a precise definition. Note that the definition in which the playback section is defined by a starting address and a playback time length is only one example, and alternatively, the playback section may be defined by a starting address and an ending address.

<Attribute Information Generating Unit 22>

The attribute information generating unit 22 generates, for each VTS, information showing an attribute (VTS_V_ATR, VTS_A_ATR). VTS (Video Title Set) is a domain for titles, and is a group composed of titles that share an image attribute and an audio attribute. The title that has VTS as a domain is called "VTS_TT(Title)". The image attribute includes such parameters as: compression format, frame rate, aspect ratio, and pan scan. Here, the compression format shows whether the format in which the moving images are compressed and encoded is MPEG 1 format or MPEG 2 format; the frame rate shows which signal format is used for a frame rate of a video signal that corresponds to a moving image; the aspect ratio shows into which of the aspect ratio is used for displaying each piece of picture data, whether 16:9 or 4:3; and the pan scan shows whether it is possible to convert into the pan scan format, in displaying the moving images.

The audio attribute is composed of such parameters as: stream number, compression format, channel number, and bit rate. Here, the stream number shows a number of audio streams to be multiplexed into the digital stream; the compression format shows a format for compressing and encoding audio; the channel number shows a number of audio to be multiplexed into the digital stream, and the bit rate is to be assigned to the audio. The described image attribute and audio attribute are to be set as encode parameters, to the SD encoder 1 and the like, in digitalizing an analogue signal. Therefore, the attribute information generating unit 22 generates VTS_V_ATR, VTS_A_ATR based on this encode parameter.

<Intra-VTS Search Pointer Generating Unit 23>

The Intra-VTS Search Pointer generating unit 23 generates a Search Pointer included in the VTS information. The Search Pointer in the VTS is called an intra-TitleSet SearchPointer, and is to be distinguished from the Search Pointer in the Video Manager. The relation between VTS_TT and the PGC information is shown in FIG. 16. In the example of FIG. 16, the Search Pointer within the VTS information shows that the VTS_TT(Title) #1, #2, #3, for the VTS information #1 within the volume menu, each correspond to the PGC information #1, #2, #3. If the button within the Volume menu is pushed down, a two-phase jump is performed by referring to the two Search Pointers that are specifically Search Pointer in the Video Manager, and Search Pointer in the VTS. The arrow signs jm1 and jm2, in the drawing, symbolically represent a two-phase jump from the button 1 to the PGC information #1. Likewise, the arrow signs jm3, jm4 symbolically represent a two-phase jump from the button 2 to the PGC information #2. That is, by referring to the Search Pointer in the Video Manager, the pushed button within the volume menu is identified as corresponding to which title, and as belonging to which VTS. Following this, by referring to the Search Pointer within the VTS, which PGC information in the title is to be read first is identified. By generating the Intra-TitleSet SearchPointer, a jump table for the two-phase jump is set within the DVD.

<Video Manager Generating Unit 24>

The Video Manager generating unit 24 generates Video Manager. Video Manager is information for controlling the menu for the entire disc (volume menu), and includes data regarding the volume menu, and playback control information used for the data playback, and Search pointer. The Search Pointer within this Video Manager is called "intra-VideoManager SearchPointer". FIG. 16 shows the volume menu and one example of the intra-VideoManager Search-Pointer. The volume menu is a menu representing a list of titles recorded on the DVD-Video, such as theater version, director's cut version, TV broadcast version, treasured image version. In the example of FIG. 16, the Search Pointer within the Video Manager represents that the buttons b1, b2, b3, b4 of the volume menu each correspond to VTS_TT#1, #2, #3 within the VTS information#1, and that the button #4 corresponds to VTS_TT#1 within the VTS information #2. The intra-VTS SearchPointer generating unit 23, in order to generate such a Video Manager, receives an editing operation from a user through the GUI, so as to generate the volume menu that is in accordance with the user design. The intra-VTS Search Pointer generating unit 23 then generates the intra-TitleSet SearchPointer that corresponds to the button of this volume menu, to finally generate the Video Manager that includes the intra-TitleSet SearchPointer, and the data for the volume menu.

<VTS Information Generating Unit 25>

The VTS information generating unit 25 groups the generated intra-TitleSet SearchPointer, into one piece of VTS information, together with the PGC information generated by the units from the PGC information generating unit 21 to the intra-VTS Search Pointer generating unit 23, and also together with the VTS_V_ATR and VTS_A_ATR.

<User Interface 26>

The user interface 26 is a user interface equipped with a CRT, an LCD, a key board, and the like, and receives such operations as: position deciding operation for deciding the starting position/ending position, of a playback section; order assigning operation for assigning playback order for each cell; and input operation for encode multiplexing parameter and volume menu, and the like.

Figure 17:
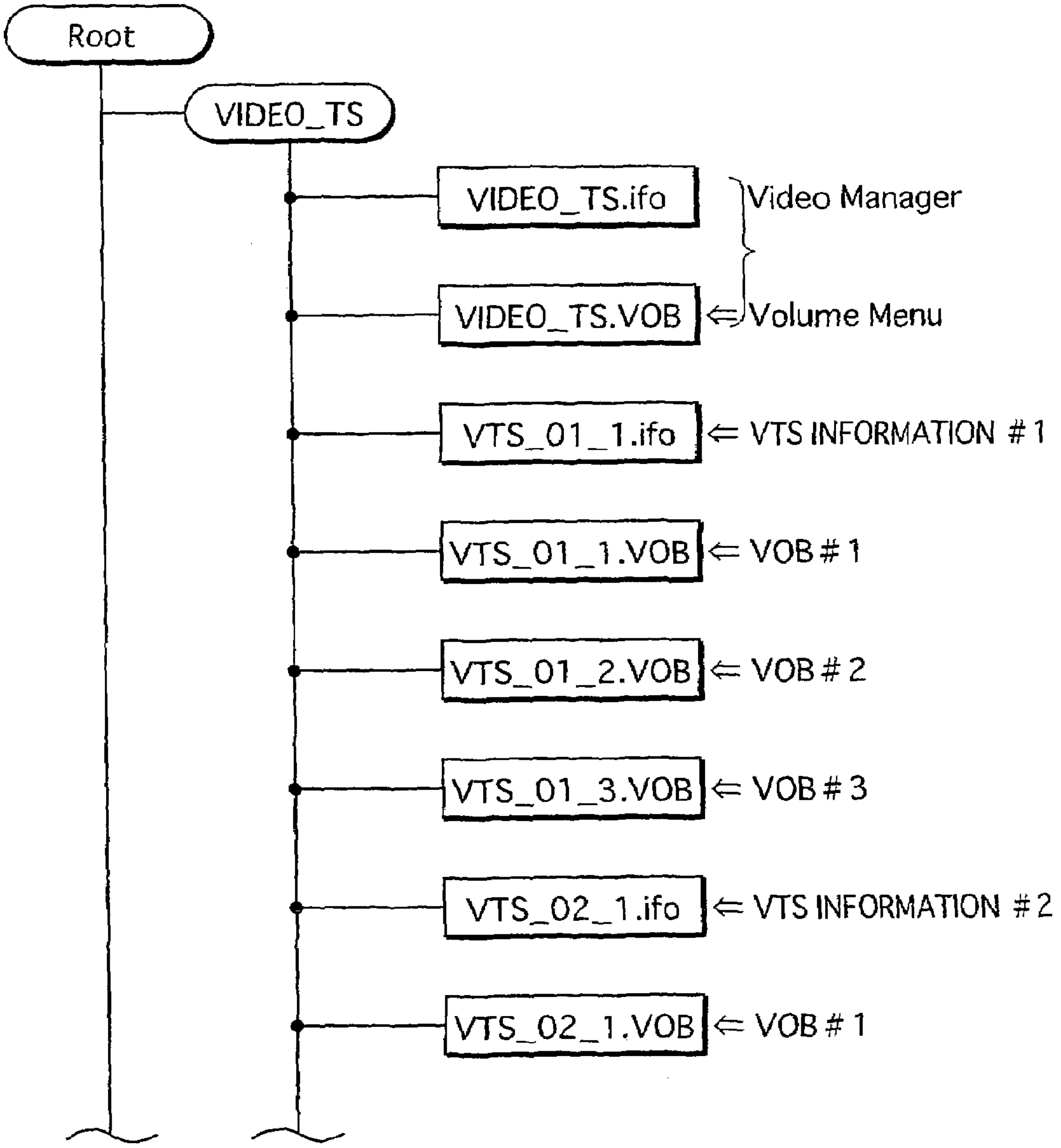
FIG. 17 is a diagram showing the file system layout that the scenario and the digital stream structure on the DVb.

The scenario for DVD having been generated through the aforementioned processes constructs a file system layout shown in FIG. 17, together with the digital stream generated by the multiplexer 2. FIG. 17 is a diagram showing the file system layout that the scenario and the digital stream constructs on the DVD. In this drawing, a subdirectory VIDEO_TS is formed under the Root directory.

The VTS information shown in FIG. 15 becomes a file whose name is "VTS_xx_x.ifo", and is disposed under the subdirectory VIDEO_TS. Here, "xx" represents the number of the VTS, and "x" represents the number of the VTS information. The VOB becomes a file whose name is "VTS_xx_x.VOB", and is disposed under the subdirectory VIDEO_TS. Here, xx represents the number of the VTS that the VOB belongs to, and "x" represents the number of the VOB.

The image data that constructs the volume menu becomes a file whose name is "VIDEO_TS.vcb". The Intra-Video-Manager SearchPointer and the playback control for the volume menu playback become a file whose name is "VIDEO_TS.ifo", and is disposed under the subdirectory VIDEO_TS.

The above description is for DVD scenario generation performed by the DVD scenario generating apparatus 3.

Figure 18:
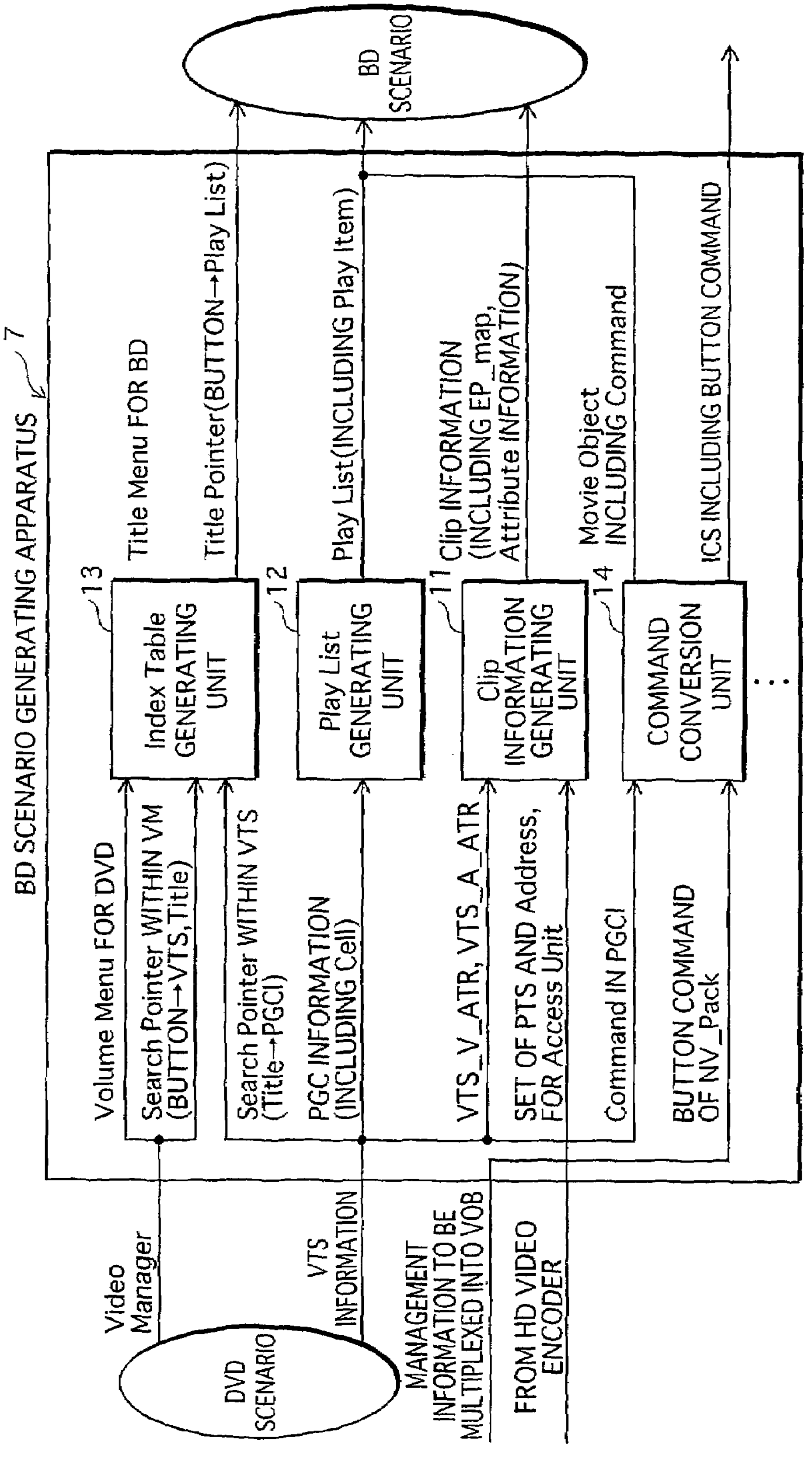
FIG. 18 is a diagram showing a specific means realized as a result of the program on the ROM and the hardware resources working together.
Figure 19:
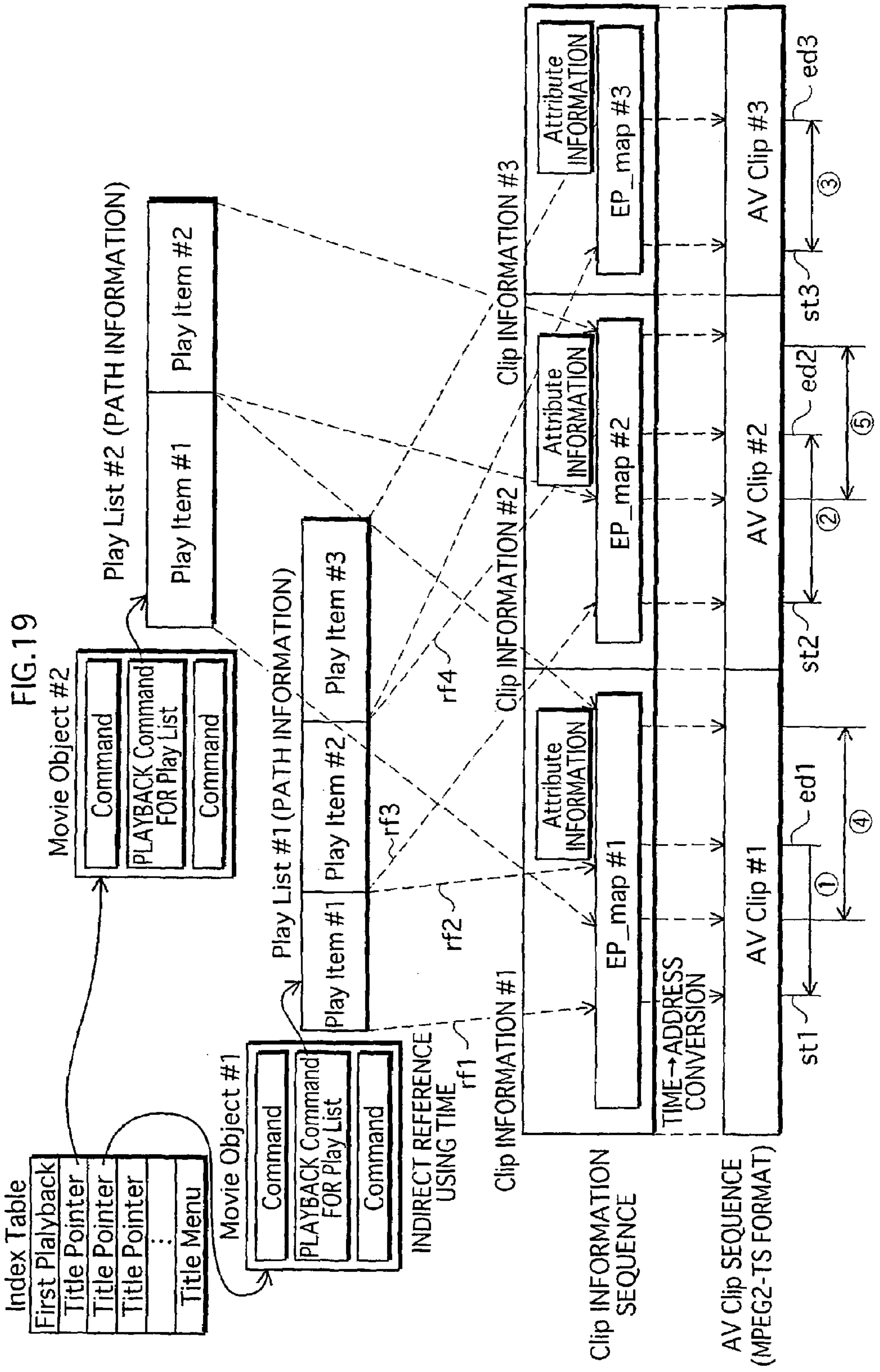
FIG. 19 is a diagram showing the structure of the titles to be stored in the BD-ROM.
Figure 20:
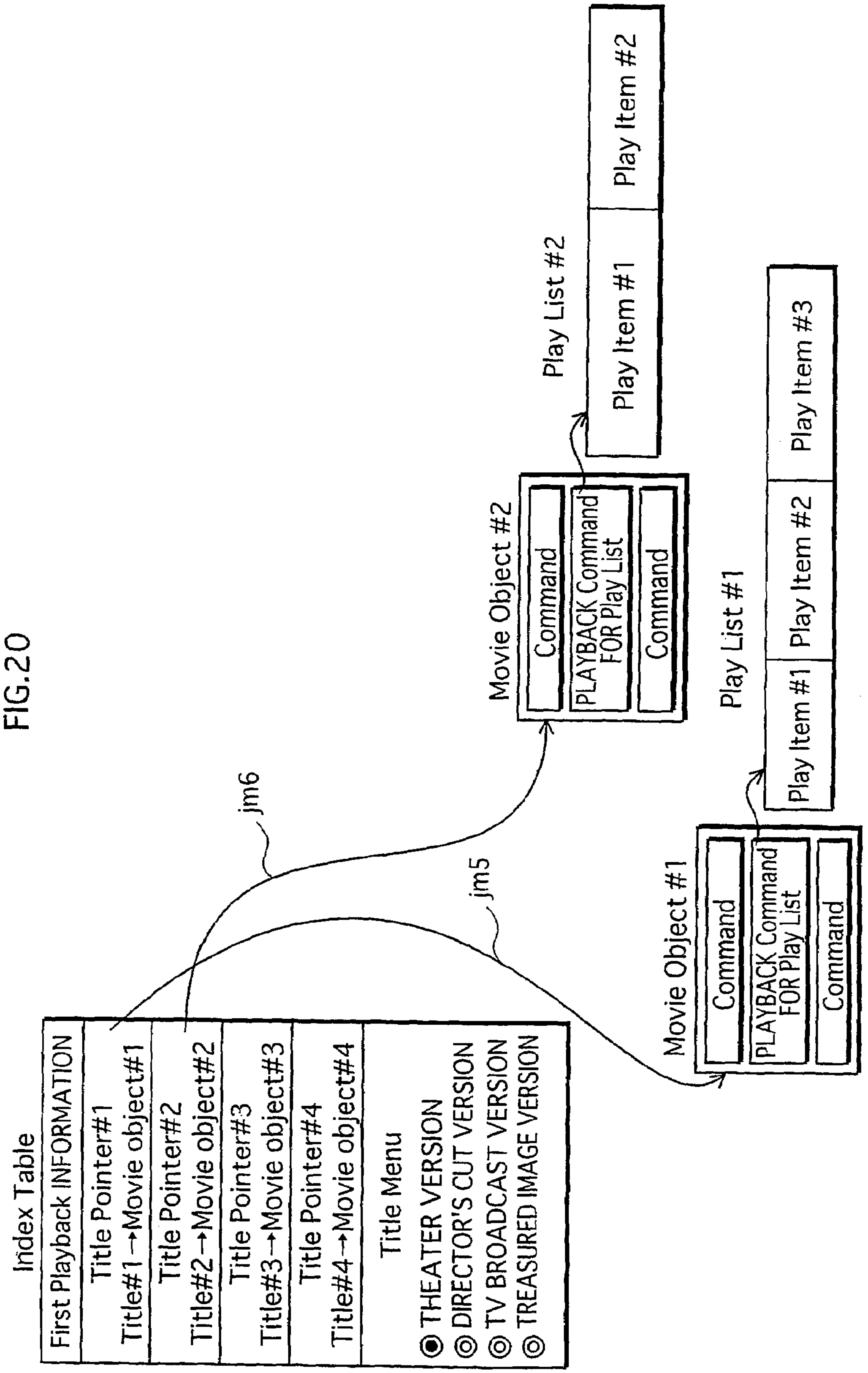
FIG. 20 is a diagram showing the process for jumping from the menu of the entire BD-ROM (Title Menu) to a Movie Object constituting each title.

Next, the BD scenario generating apparatus 7 which is the core of the generating apparatus is described. The BD scenario generating apparatus 7 is a system LSI, in which a typical computer system that is comprised of a CPU, a ROM storing a program, and a RAM, is integrated. The program stored in the ROM is read onto the CPU. The BD scenario generating apparatus 7 pursues its function by the program and the hardware resources working together. FIG. 18 is a diagram showing a specific means realized as a result of the program on the ROM and the hardware resources working together. As shown in this drawing, the BD scenario generating apparatus 7 is comprised of a Clip information generating unit 11, a PlayList generating unit 12, an Index Table generating unit 13, and a command conversion unit 14. Since it is difficult to understand the BD scenario generating unit 7 only from FIG. 18, FIGS. 19-20 are also referred to, in the following description in which the structural elements of the BD scenario generating apparatus 7 are explained.

<Clip Information Generating Unit 11>

The Clip information generating unit 11 generates Clip information for each digital stream to be recorded on the BD-ROM. The Clip information is management information set for each AVClip (i.e. management information for a digital stream), and includes EP_map and information for encoding the AVClip. The Clip information is information generated envisioning the real time recording of the digital stream, and does not exist in the DVD-Video. The reason why such Clip information generation is required even in the ROM standard, is that the application layer standard for BD-ROM takes into account the compatibility with the recording standard (BD-RE).

Clip information is generated by the Clip information generating unit 11 in the following process. Once a new digital stream is obtained as a result of encoding of the HD video encoder 5, the Clip information generating unit 11 generates EP_map regarding this digital stream. Then, the Clip information generating unit 11 searches for the place where the beginning of each Access Unit exists, in the digital stream generated for BD-ROM, and generates EP_map in which the starting time of each Access Unit is corresponded with the address of each Access unit that is based on the beginning of the digital stream. Here, the beginning address of each Access Unit is desirably written in the form of the packet number of the PES packet situated at the beginning of the Access Unit. In addition, the Clip information generating unit 11 detects audio attribute and image attribute of a title that a digital stream belongs to, from the VTS_V_ATR, VTS_A_ATR of the VTS information, so as to generate Attribute information representing the audio attribute and the image attribute for each digital stream of a title. Thus generated EP_map and Attribute information, in pairs, will be Clip information. Note that if a video stream is newly generated for BD-ROM, it is not proper to generate Attribute information from the VTS_A ATR of the VTS information. The reason is that the image attribute greatly differs for a case where the video stream generated by the HD video encoder is multiplexed into the digital stream, from in a case where the video stream that the SD video encoder 1 is used in multiplexing. Therefore, it is not proper to use the image attribute for the HD video encoder as it is. VTS_A_ATR of VTS information can be used in generation of Attribute information, only if the image attribute to be multiplexed into a digital stream is the same as that of the DVD. The same thing can be said to the case of audio.

<PlayList Generating Unit 12>

The PlayList generating unit 12 generates Play List for each title to be stored in the BD-ROM. Play List is path information specifying a logical playback path of the digital stream of the BD-ROM. FIG. 19 is a diagram showing the structure of the title to be stored in the BD-ROM. In this drawing, the AVClips #1, #2, #3 are each one digital stream, and the Play Lists #1, #2 are each path information. As in DVD-Video, the path information is created by arranging, according to the playback order, pieces of information that each represent a logical playback section. The difference is how to define the playback sections. For the AVClips #1, #2,

#3, the sections specified by (1) (2) (3) (4) (5) are logical playback sections. In this drawing, these playback sections are specified by an indirect reference by means of time information. The arrow signs in broken lines rf1, rf2, rf3, and rf4 in this drawing symbolically represent indirect reference by means of time information. This indirect reference by means of time information is performed by the medium of the EP(Entry Point)_map. That is, the PGC information in DVD defines the playback sections by means of a set of disc address and playback time length, whereas the Play List defines the playback sections with use of a starting time and an ending time. In light of this difference in method of defining playback section, the PlayList generating unit 12 obtains Play List by converting the defining method. This conversion is detailed as follows.

First, the PlayList generating unit 12 specifies the VOBUs that each correspond to the starting position and the ending position of a playback section, using the disc address and the playback time length in the Cell. Thus specified VOBUs are each called In-point VOBU, and Out-point VOBU. Then a playback-starting time of the In-point VOBU and a playback-ending time of the Out-point VOBU are each obtained, thereby generating a PlayItem composed of the playback-Starting time and the Playback-ending time. By repeating the aforementioned process for each of Cell information that constitutes the PGC information, a plurality of Play Items are obtained. Once the plurality of Play Items are obtained in the above way, the Play List composed of the generated Play Items is obtained. Note that if a playback section is defined by a starting address and an ending address, the In-point VOBU and the Out-point VOBU can be identified first, and then can be replaced by the playback starting time and the playback end time.

<Index Table Generating Unit 13>

The Index Table generating unit 13 generates Index Table. One example of the Index Table is shown in the far-left portion of FIG. 19. The Index Table is information managing a plurality of titles recorded on BD-ROM, and includes First PlayBack information, a plurality of Title Pointers, and a Title Menu. The First PlayBack information is information to be first read by the playback apparatus, at the time when the BD-ROM is loaded onto the playback apparatus, and controls the playback apparatus so as to display the Title Menu. The Title Menu is a menu that corresponds to a volume menu in the DVD, and displays a list of titles that have been recorded on the BD-ROM. The plurality of Title Pointers are each associated with the buttons in the Title Menu, and show the correspondence between each title recorded on the BD-ROM and a Movie Object. As follows, this Index Table is detailed with reference to FIG. 20. FIG. 2-0 is a diagram showing the process for jumping from the menu of the entire BD-ROM (Title Menu) to a Movie Object constituting each title. The Title Menu in FIG. 20 displays a list of titles recorded on the BD-ROM, such as theater version, director's cut version, TV broadcast version, and the like. Each Title Pointer in the Index Table corresponds to a button in the volume menu; and each TitlePointer shows which Movie Object corresponds to each title. In the example of FIG. 20, the Title Pointer shows that the buttons 1, 2, 3, 4 in the volume menu each correspond to the titles #1, #2, #3, #4, and further to the Movie Objects #1, #2, #3, #4. Since the Index Table is generated by the BD scenario generating apparatus 7, direct jump to the Movie Object is realized, if the menu-call button is pushed while the playback apparatus is performing playback, by referring to the Title Pointer in this Index Table. The arrow sign jm5 in the drawing symbolically shows the jump from the button 1 to the Movie Object #1. Likewise, the arrow sign jm6 in the drawing symbolically shows the jump from the button 2 to the Movie Object #2.

Next, as follows, how the Index Table generating unit 13 generates this Index Table is described. DVD-Video adopts a two-phase jump method in which playback control information (PGC information) to first perform playback control is defined via the SearchPointer within the Video Manager and via the SearchPointer within the TitleSet. The reason for this is as follows. That is, the concept of VTS is unique to the DVD-Video standard, for which it is requested that movie contents that share the same audio and image attributes should be grouped together. However, such a request is unnecessary for the application layer standard of BD-ROM. Since no more grouping by means of VTS has become unnecessary, the Index Table generating unit 13 generates a simple Index Table based on the Video Manager, so as to enable direct jump from the button within the Title Menu to the playback control information (Movie Object).

<Command Conversion Unit 14>

The command conversion unit 14 obtains a command for BD-ROM, by converting a plurality of commands defining playback control for the DVD-Video. Commands obtained by the command conversion unit 14 include a button command (1) to be multiplexed into a digital stream, and a command (2) to be recorded on the BD-ROM separately from a digital stream. The command (2) to be recorded on the BD-ROM separately from a digital stream constitutes a Movie Object.

First, the conversion for a button command is described. In DVD-Video, button commands are disposed in NV-Pack as a part of the menu management information. In DVD-Video, only one NV-Pack is disposed at the beginning of a VOBU. Since there is a restriction in number that a VOBU has to have only one NV-Pack, and that a plurality of commands have to be assigned button commands, there is accordingly a strict restriction about number and bit length for button commands, in DVD-Video. To be more specific, only one button command can be described for each button, and the length of a button command is limited to 16 bits. Since the bit length and the number of commands have such limitations, a command set is determined so that one command is assigned to describe the combination of processes that are used frequently. A command that commands execution of a plurality of processes at a time is called "combining command." For DVD-Video, the following commands are defined as combining commands: Compare&Set command, Set&Link command, and Set then Compare Link command.

However, if a combination of processes that the user wants to execute has not yet been defined in the command set, then it is necessary to describe a trap routine in advance, and to execute this trap routine when the button is pushed during the menu display. The trap routine, when the menu button is pushed for a certain VOBU, jumps to a command field for PGC information (i.e. a field in which Post Command is described, and is called PGC Tail), and after execution of the command in this field, returns to the initial VOBU. Examples of combination of processes that have not been prepared as a combining command is a combination of: a process of switching from an audio stream to another, and then jumping to another title; and a process of determining a button to be in a highlight condition, when returning from the title. This combination of processes has to be determined as a trap routine.

Whereas for BD-ROM, data used for interactive control may be transmitted as a segment made up of two or more PES packets (Interactive Composition Segment). Accordingly, there is no restriction, in bit length and number, for button commands. Because the restriction in number of commands is abandoned, no combining command for executing a plurality of processes at a time, is defined in a command set. In light of the aforementioned difference, the command conversion unit 14 performs such as a process of replacing a trap routine with one or more button commands, and a process of replacing one combining command with two or more button commands. As aforementioned, the command conversion unit 14 replaces the combining commands and the trap routines within the NV-Pack, with corresponding button commands. Accordingly, if coding and debagging of button commands and of PGC information commands have been complete at the time of DVD-Video production, it becomes possible to generate BD-ROM button commands, half-automatically. This means that button commands for BD-ROM can be created, without any substantial trouble incident to coding and debagging of button commands, for BD-ROM.

Next, generation of Movie Object is described. The command conversion unit 14 obtains Movie object, by extracting PRE command and POST command from the PGC information, and inserting a playback command for Play List, between the PRE command and the POST command. The Movie Objects #1, #2 in FIG. 19 are Movie Objects obtained by converting the PGC information #1, #2 of FIG. 15. Note that needless to say, if a part of the Post Commands disposed in the PGCTail is converted into button commands, the rest of the Post Commands will become Movie Objects.

In DVD, the timings with which menus and sub-picture data are displayed are defined in the commands of the sub-picture stream. On the other and, in BD-ROM, the timings with which menus are displayed are defined by the PTSs of the ICSs within the interactive graphics stream. Because of this difference, the command conversion unit 14 refers to the values shown by the commands of the sub-picture stream, thereby generating the PTSs showing the timings, and adds the ICSs to the PTSs. The description so far is about the command conversion unit 14.

Figure 21:
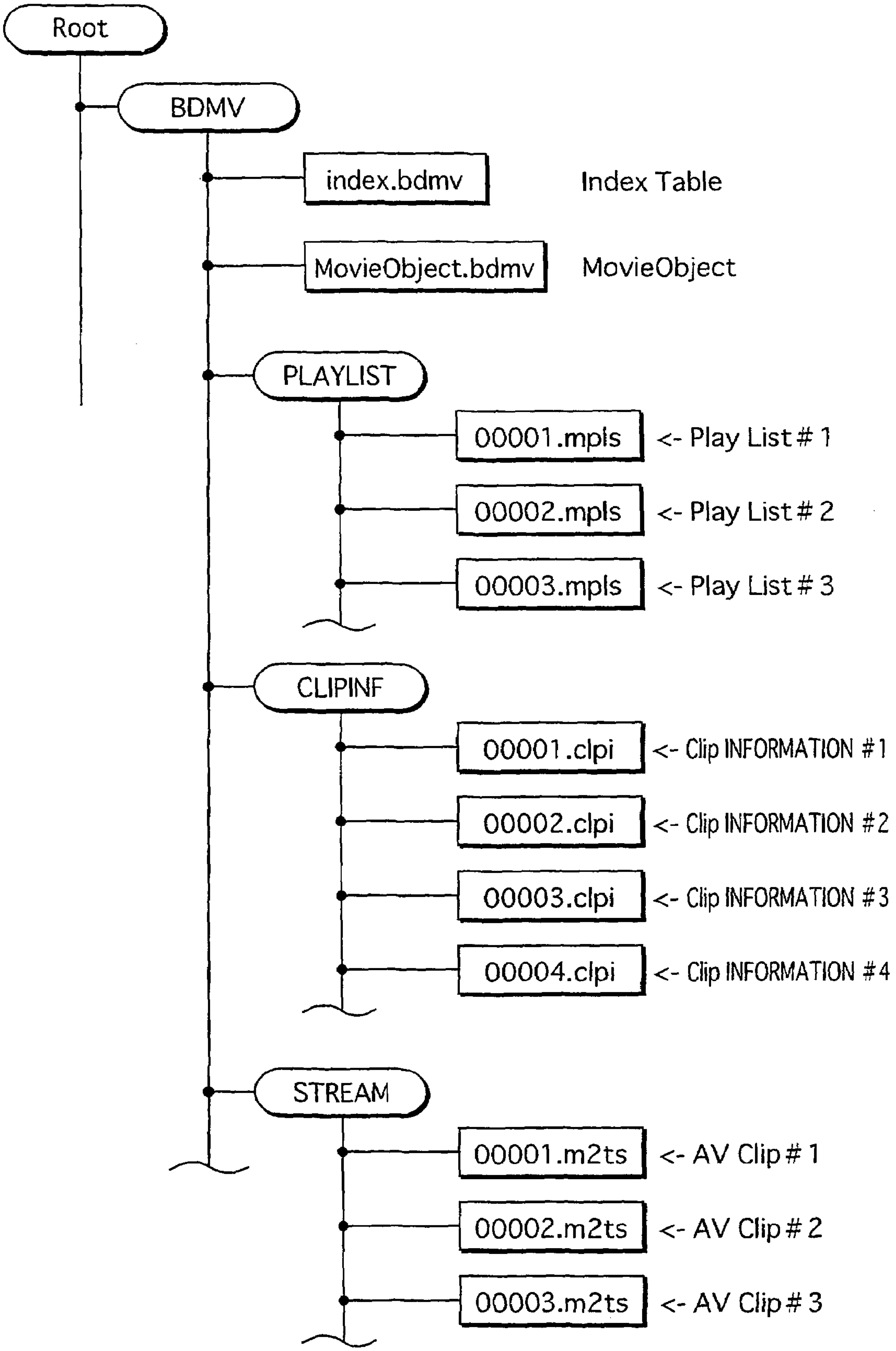
FIG. 21 shows how the scenario and the digital stream are disposed on the file system.

The scenario generated by the BD scenario generating apparatus 7 is disposed in the directories and files, that are depicted in FIG. 21, together with the digital stream generated by the multiplexer 6. FIG. 21 shows how the scenario and the digital stream are disposed on the file system. In this drawing, a subdirectory called BDMV is formed under the Root directory. Under this BDMV directory, a PlayList directory, a ClipINF directory, and a STREAM directory are disposed.

The Clip information shown in FIG. 19 is disposed in the ClipINF directory, as a file having a name of "xxxxx.clpi. Here, "x" signifies a number corresponding to the Clip information. The AVClip is disposed in the STREAM directory, as a file having a name of "xxxxx.m2ts". Here, "x" signifies a number corresponding to the AVClip. The Play List is disposed in the PlayList directory, as a file having a name of "yyyyy.mpls". Here, "y" signifies a number corresponding to the Play List. Information elements constituting TitleIndex are recorded in the BDMV directory, as a file having a name of "index.bdmv". The BD scenario generating apparatus 7 displays such a file and a directory. In such a display, the file resulting from conversion of the DVD scenario is displayed in a form different from a form used for displaying files initially created for BD.

Note that among the data defined in the application layer of BD-ROM, other data than those defined by the Clip information generating unit 11, the PlayList generating unit 12, the VolumeMenu generating unit 13, and the command conversion unit 14 is inputted by an interactive operation by a user. The data required to be inputted through such an interactive operation is data that is undefined in DVD, but is defined in BD-ROM.

So far is the detailed description about the BD scenario generating apparatus 7.

As follows, the flow of operation performed by the BD scenario generating apparatus 7 is described, with reference to the flowchart of FIGS. 22-26.

Figure 22:
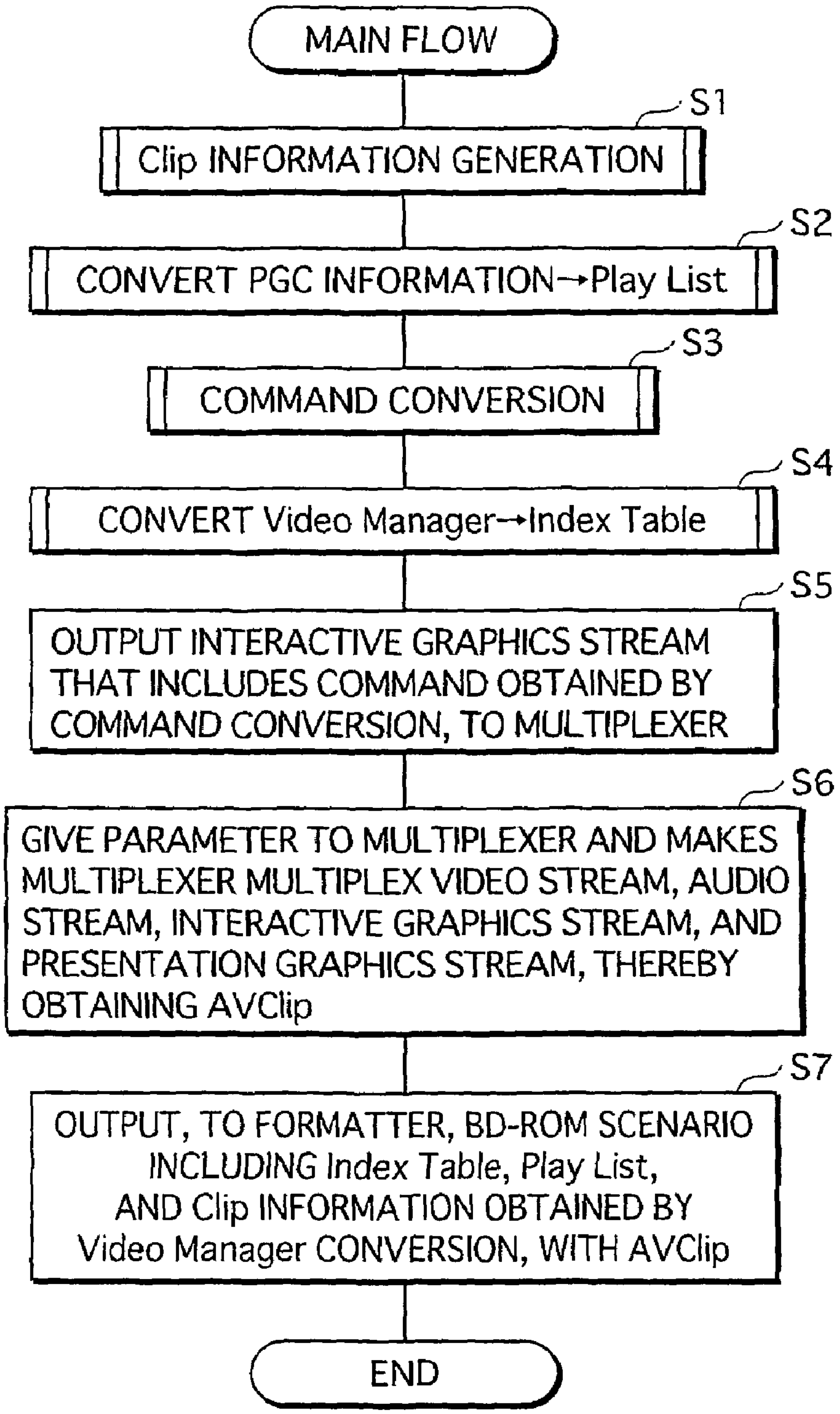
FIG. 22 shows a main flow showing the overview of the process performed by the BD scenario generating apparatus.

FIG. 22 shows a main flow showing the overview of the operation performed by the BD scenario generating apparatus 7. Clip information is generated (Step S1), PGC information is converted into a Play List (Step S2), commands included in the NV-Pack and in the PGC information are converted (Step S3), and Video Manager is converted into Index Table (Step S4). Through these conversion operations, all the information that constitute the scenario for BD-ROM is obtained. After these operations, menu management information including the commands obtained by the command conversion are outputted to the multiplexer 6 (Step S5), and the BD scenario generating apparatus 7 gives a multiplexing parameter to the multiplexer 6, and makes the multiplexer 6 perform multiplexing of the video stream, the audio stream, and the menu management information, thereby obtaining an AVClip (Step S6)

Now that the AVClip is obtained, the BD scenario generating apparatus 7 outputs, to the formatter 8, the BD-ROM scenario that includes the Index Table, the Play List, and the Clip information, together with the AVClip (Step S7). The volume image will be obtained after the formatter performs its operation.

Figure 23:
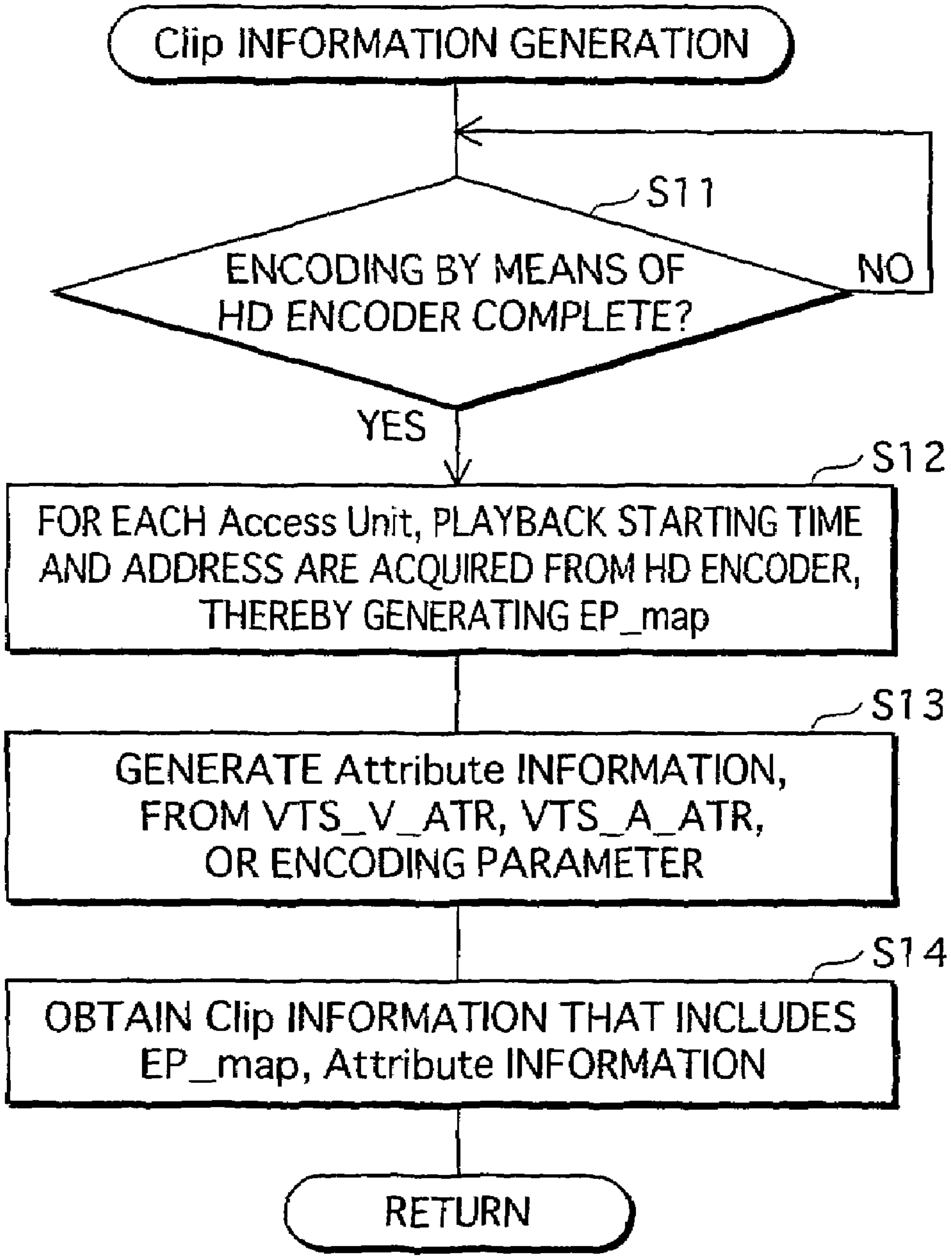
FIG. 23 is a diagram showing the procedural steps performed by the Clip information generating unit 11.

The Clip information generating unit 11 performs the operation at Step S1 in the main flow of FIG. 22, and describes the operation shown in the flowchart of FIG. 23 in a computer language, and makes a processor execute the described operation.

Next, the generation of Clip information is described with reference to this flowchart. First, whether the HD video encoder 5 completes encoding is checked (Step S11), if encoding has been complete, the playback starting time and the address, for each Access Unit, are acquired from the HD video encoder 5, thereby generating an EP_map (Step S12). Then, Attribute information is generated, either using VTS_V_ATR, VTS_A_ATR of the VTS information, or the encode parameter used in encoding (Step S13), and Clip information including the EP_map and the Attribute information (Step S14).

Figure 24:
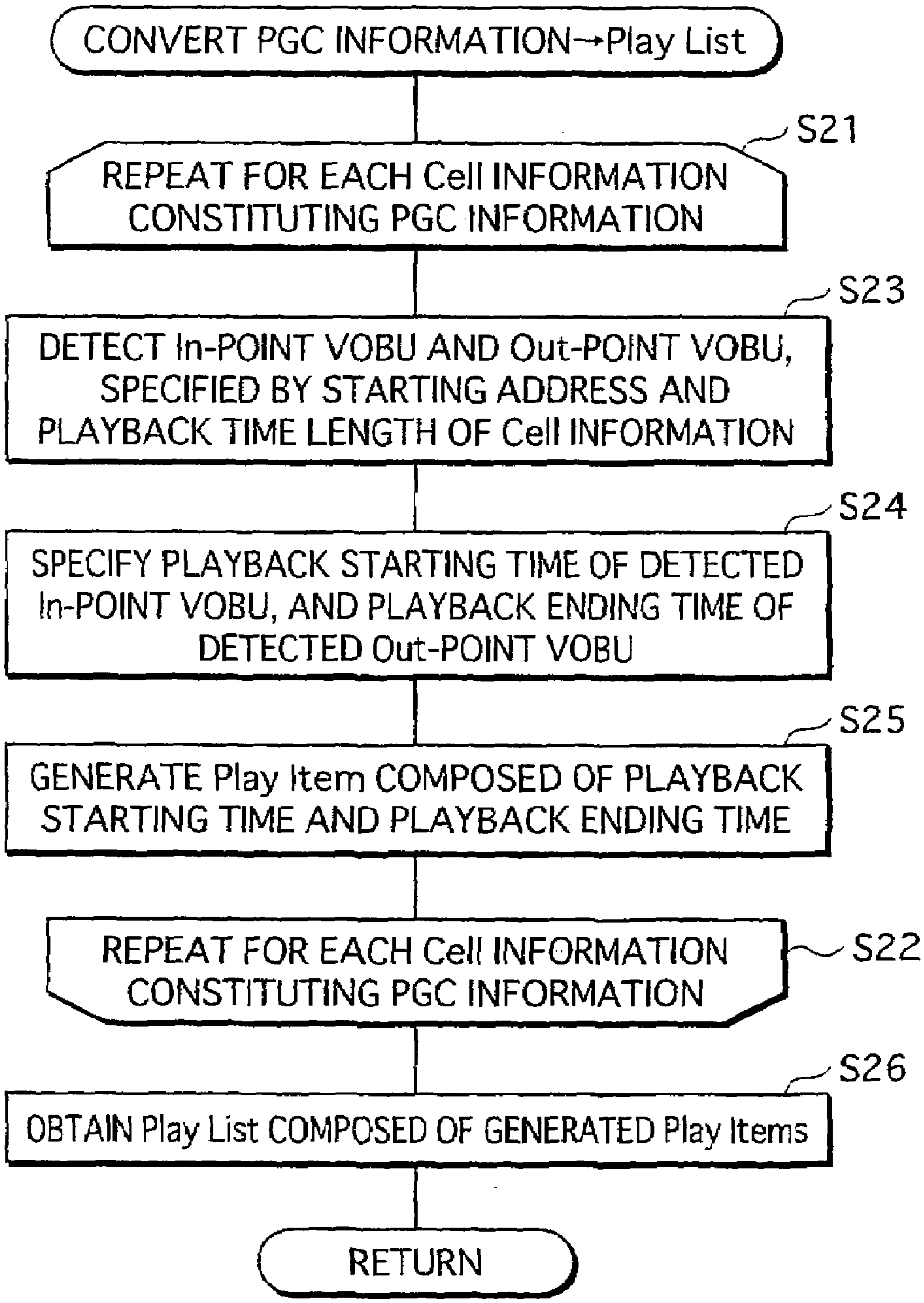
FIG. 24 is a diagram showing the procedural steps performed by the PlayList generating unit 12.

The PlayList generating unit 12 describes the operation shown in the flowchart of FIG. 24, in a computer language, and makes a processor execute the described operation.

This flowchart is in a loop structure in which the operations from Step S23-Step S25 are repeated for each Cell information structuring the PGC information (Step S21, Step S22). Suppose that the Cell information that is a process target in this loop operation is called "Cell information x". First, for this Cell information x, the starting address, and In-point VOBU and the Out-point VOBU that are specified by the playback time length are detected (Step S23). Then the starting time of the detected In-point VOBU, and the ending time of the detected Out-point VOBU are identified (Step S24), thereby generating the Play Item composed of the starting time and the ending time (Step S25). By repeating the above operations for each Cell information constituting the PGC information, a plurality of Play Items are obtained. Then, a Play List composed of thus obtained plurality of Play Items is obtained (Step S26).

Figure 25:
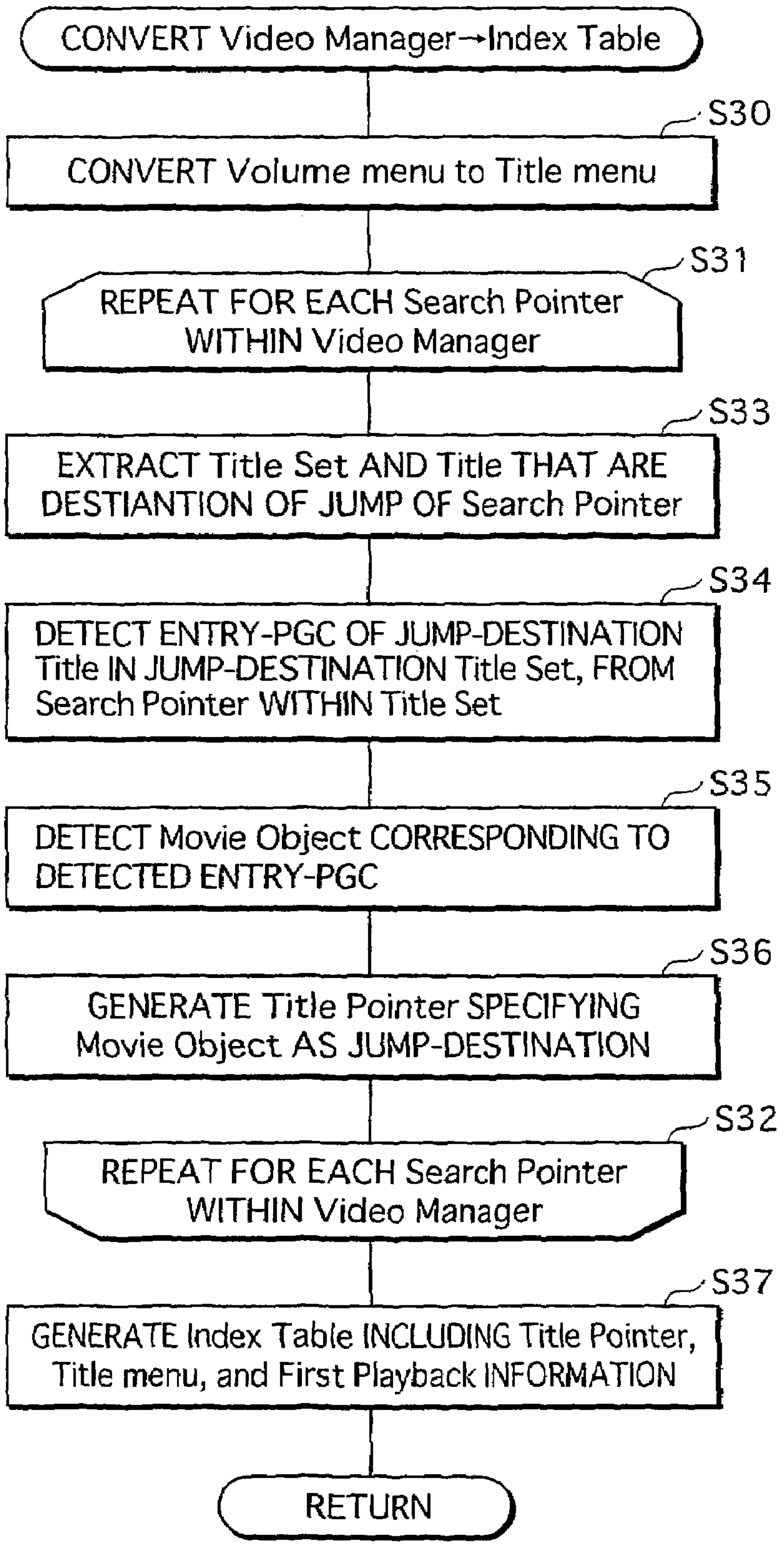
FIG. 25 is a diagram showing the procedural steps performed by the VolumeMenu generating unit 13.

The Index Table generating unit 13 describes the operations described in the flowchart of FIG. 25 in a computer language, and makes a processor execute the described operations.

This flowchart is in a loop structure in which, after the Volume Menu is converted into the Title Menu (Step S30), operations of Step S33-Step S36 are repeated for each of the Search Pointers within the Video Manager (Step S31, Step S32). Here, each Search Pointer is called "Search Pointer X". At Step S33, the VTS and the title that are the destination of the jump of the Search Pointer X, are extracted, and at Step S34, entry PGC of the jump destination title in the jump destination VTS is detected, from the Search Pointer within the Title Set. At Step S35, a Movie Object that corresponds to the entry PGC is detected, and at Step S36, a Title Pointer which specifies the Movie Object as the Jump destination is generated. By repeating Steps S33-Step S36 for each Search Pointer within the Video Manager, a plurality of Title Pointers will be generated which specify a plurality of Movie Objects as the jump destinations. The plurality of Title Pointers generated in the above way will be combined with the Title Menu and the First Playback information that have been obtained at Step S30, thereby generating an Index Table containing them (Step S37), then the operation in this flowchart finishes.

Figure 26:
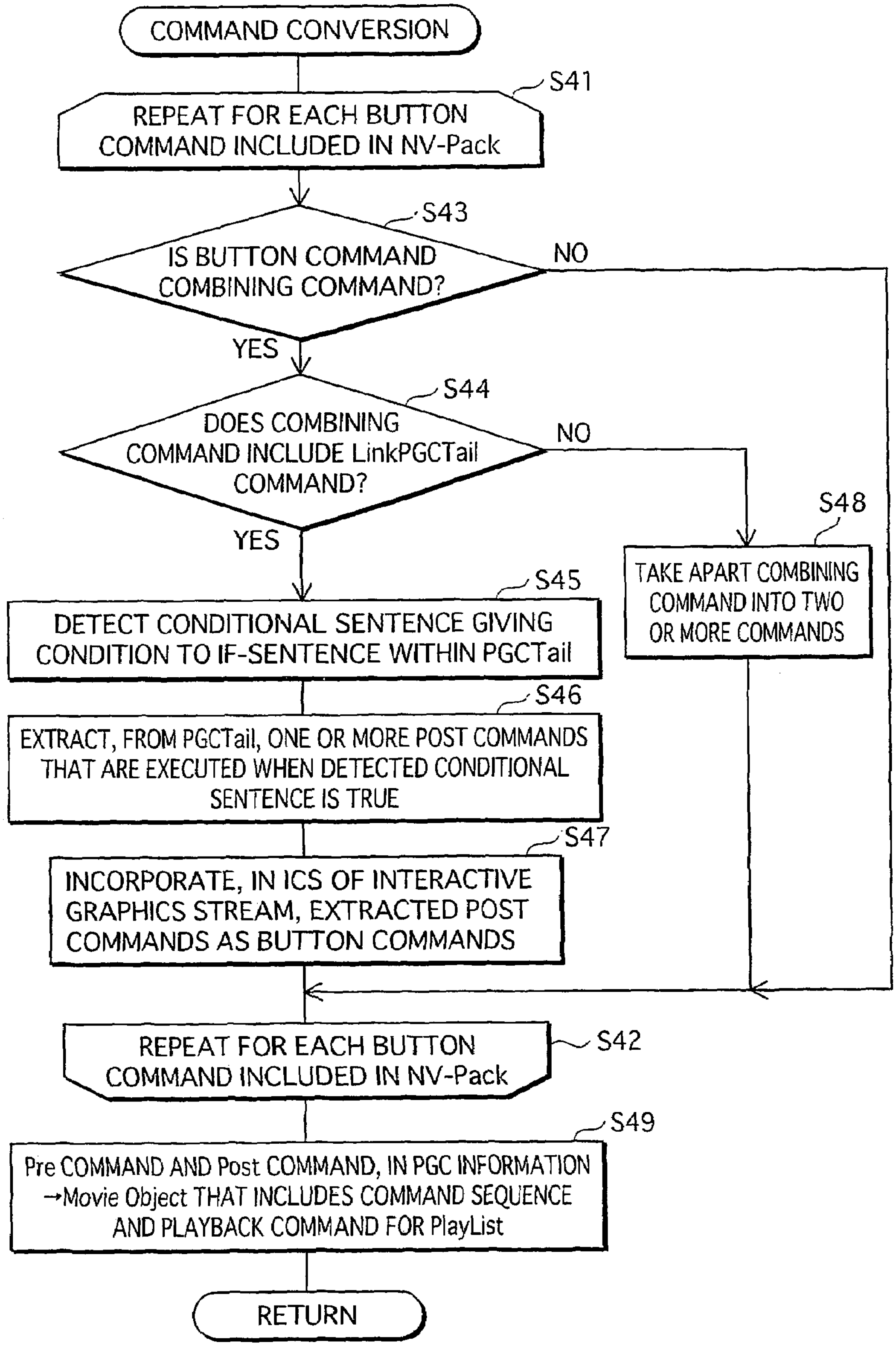
FIG. 26 is a diagram showing the procedural steps performed by the command conversion unit 14.

The command conversion unit 14 is structured by describing the operation shown in the flowchart of FIG. 26, and then making a processor execute the operation.

Step S41 and Step S42 in this flowchart form a loop structure in which Step S43-Step S48 are repeated for each of the button commands included in the NV-Pack. Step S43 is a step for judging whether a button command is a combining command or not. If the button command is not a combining command, no operation is performed on the button command. At Step S44, judgment is performed as to whether the combining command includes a LinkPGCTail command or not. If the combining command does not include such, the combining command is taken apart into two or more commands, then the operation moves on to the next button command.

If the combining command includes such a LinkPGCTail command, a trap routine is extracted. First, a conditional sentence is detected that gives a condition to the if-sentence within the PGCTail (Step S45). One or more commands to be executed if the detected conditional sentence is true, are taken out from the PGCTail (Step S46), and the one or more commands taken out are incorporated in the menu management information, as a button command (Step S47).

By repeating the operation from Step S43-Step S48 for each of the button commands included in the NV-Pack, the button commands for BD-ROM will be obtained. Lastly, the playback command for the Play List is inserted between the Pre-command and the Post-Command in the PGC information (Step S49), thereby obtaining the Movie Object, and the operation in this flowchart finishes.

The following describes how the command conversion unit 14 performs its operation if the three button commands as shown in FIG. 27A are described in the NV-Pack, and if commands as shown in the FIG. 27B are described in the PGCTail. Suppose here that among the three button commands of FIG. 27A, the button command for the button 1 (Button command 1) is a target of operation. Since the button command 1 specifies the PGCTail as a jump destination, this button command 1 is detected at Step S44. If-sentence for switching between operations exists in the PGCTail. This conditional sentence for switching If-sentence is determined by the variable GPO, and the button command 1 substitutes an immediate "1" for this GPO. Therefore, the conditional sentence "GPO=1" is detected at Step S45. At Step S46, a command sequence that is executed when the conditional sentence "GPO=1" is true is extracted from the PGCTail. If the conditional sentence "GPO=1" is true, the command sequence to be executed is "Audio Stream=1", "Highlighted Button=2", and "Jump Title 10". By replacing the detected command sequence in such a way with button commands, the button command sequence for the button 1 as shown in FIG. 27B is obtained. If the same operations are repeated for the button commands for VOB #1 and VOB #3, the button command sequences as shown in FIG. 28 will be obtained.

Note here that in the example of FIG. 27A, the if-sentence is described so as to perform comparison between the immediate and the variable. However, in the DVD command, the comparison with the immediate cannot be described. In reality, it is desirable that such an immediate is temporarily stored in a variable (i.e. register), and to describe in the form of the comparison between variables.

The following describes how many number of man-hours can be eliminated within the authoring step, in the generating apparatus structured in the above way. In the authoring for distribution of DVD-Video, a little more than a week of man-hour is supposed to be spent. This is because such operations will be repeated over and over again, as examining the quality of the movie content by eyes, changing the distribution of bit rate according to the examination result, and re-arranging the bit rate for re-encoding. On the other hand, it also takes a little more than a week to examine and arrange the scenario. This is because it becomes necessary to perform debug and test, just as in the shipping of the program, for checking to see if the playback control is correctly performed according to the playback control.

In the generating apparatus relating to the present invention, when the DVD-Video authoring is complete after spending two weeks of man-hour (1 week plus 1 week), playback control information for BD-ROM is created, based on the completed volume image. Therefore, it shortens the time required for examining and arranging the BD-ROM playback control information. Once the DVD-Video authoring is complete, it only requires a little more than a week for the BD-ROM authoring (Here, 1 week for performing encoding to generate a digital stream, and a little extra time is for arranging the sections of the playback control information). Therefore, if a distributor needs to distribute through the DVD-Video and the BD-ROM, it is possible to attend to the need promptly and adequately.

According to the present embodiment, as stated in the above, once the DVD-Video volume image is generated by spending a large number of man-hour, it becomes possible to generate a BD-ROM volume image, based on the playback control information among the DVD-Video volume image. By making use of the information resources cultivated for DVD-Video distribution, a volume image for BD-ROM can be generated. This eliminates overlaps of time and trouble spent, for any disc distribution, by the production studio.

Note that in the aforementioned embodiment, the command conversion unit 14 converts the DVD-Video button commands into those for the BD-ROM. However, in addition to this operation, it is also possible to generate a JAVA program that makes the playback apparatus perform the same operation as the BD-ROM button commands. Generation of such a JAVA program allows close relation between the playback apparatus with the other information electric appliances on the home network, or with the WWW server in the Internet.

In addition, the BD scenario generating apparatus 7 of the present embodiment generates a BD-ROM scenario based on the DVD-Video scenario that is generated by the DVD scenario generating apparatus 3. However, it is also possible to generate a BD-ROM scenario, by detecting the scenario already recorded on the DVD-Video. By doing this, it enables efficient re-distribution of a movie content through BD-ROM that has been once distributed through DVD-Video.

The Second Embodiment

Figure 29:
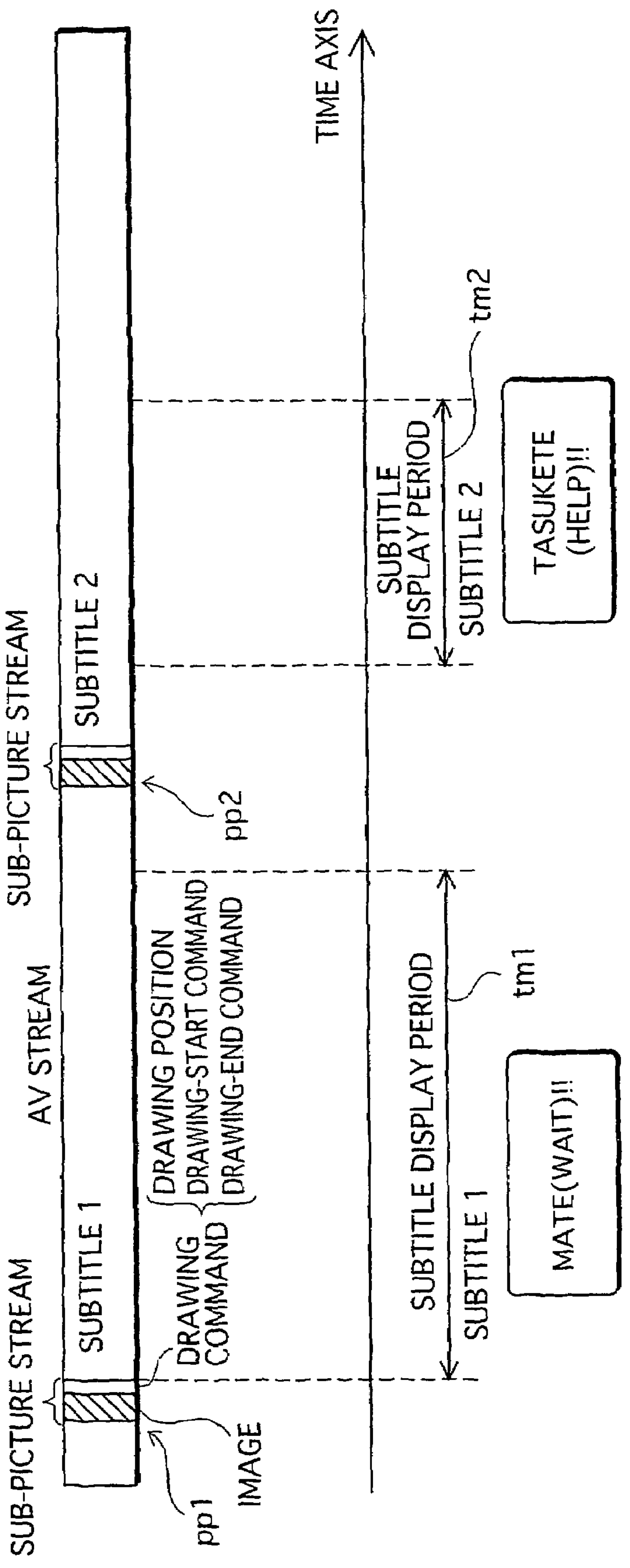
FIG. 29 is a diagram showing how sub-picture data is disposed within a digital stream.

The second embodiment relates to improvements on how to multiplex sub-picture data, in generation of a BD-ROM volume image. FIG. 29 is a diagram showing how the sub-picture data is disposed within a digital stream. In this drawing, the vertical axis represents a time axis according to which the digital stream should be played back. In this time axis, suppose that the subtitle 1 "Wait!" in Japanese is to be displayed in the period tm1, and the subtitle 2 "Help!" in Japanese should be displayed in the period tm2. In this case, prior to these periods tm1 and tm2, it is necessary that the playback apparatus read the sub-picture data constituting these subtitles. Moreover, it is necessary to dispose the sub-picture data constituting the subtitle 1 at the position pp1, and the sub-picture data constituting the subtitle 2 at the position pp2, prior to the arrival of the periods tm1 and tm2. The sub-picture data disposed at pp1 contains image data constituting the subtitle and a drawing command for drawing this image data. The drawing command includes a drawing position of the subtitle on the screen, a drawing-start command representing a starting time at which the drawing for this subtitle should begin, and a drawing-end command representing an ending time at which the drawing for this subtitle should be finished.

The operations of disposing the sub-picture data in such a way, and of describing the drawing command are the operations performed by the multiplexer 2, the DVD scenario generating apparatus 3, the multiplexer 6, and the BD scenario generating apparatus 7, in multiplexing sub-picture data. If the sub-picture data is disposed in such a concept, the disposition position of the sub-picture data is determined a little prior to the display-start time of the subtitle.

Figure 30:
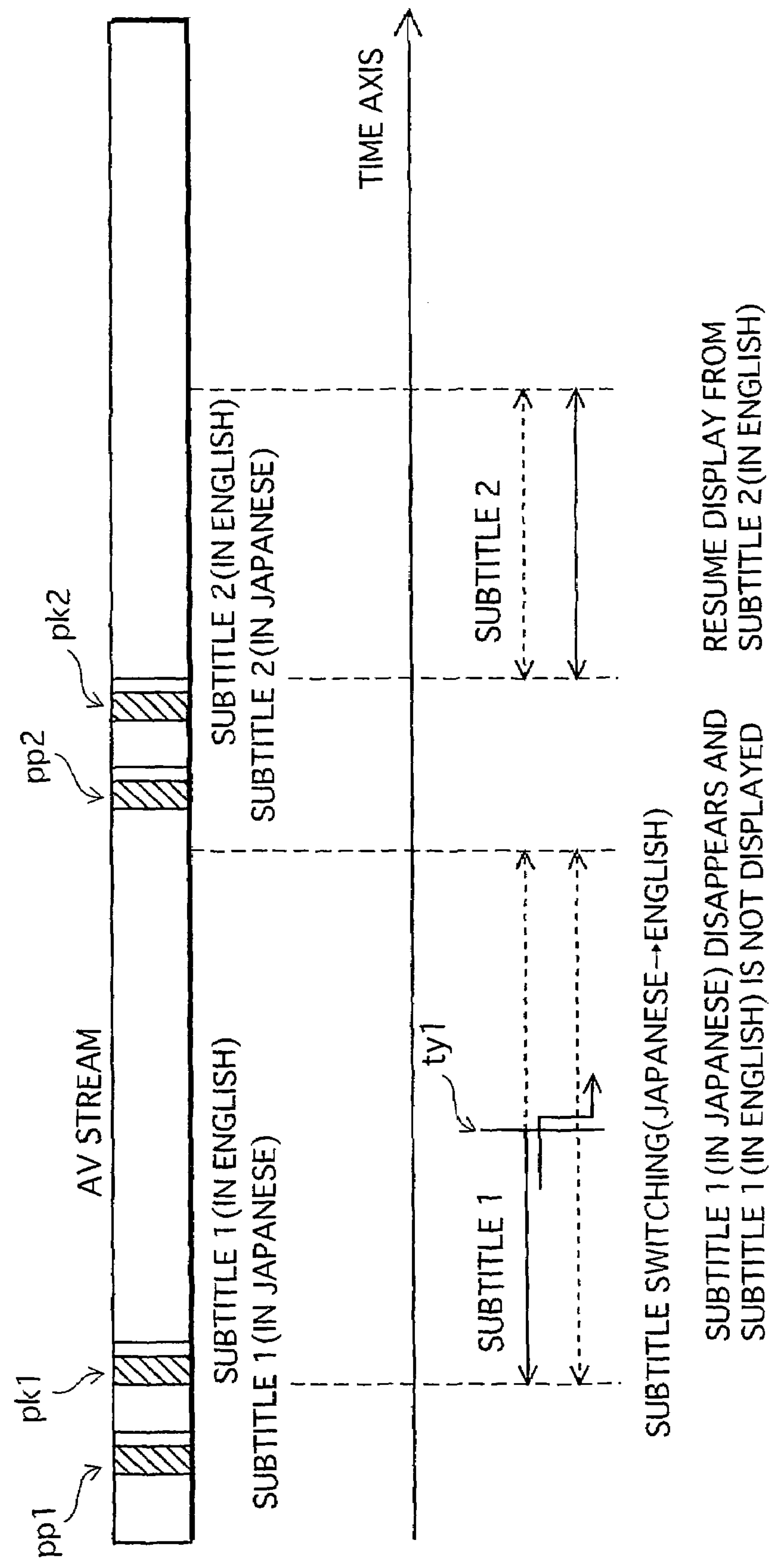
FIG. 30 is a diagram showing the digital stream in which bilingual subtitles are disposed so as to realize display with a plurality of languages.

What becomes a problem regarding such a disposition position determination is a language switching operation during the playback of a digital stream. FIG. 30 is a diagram showing the digital stream on which the subtitles corresponding to bilingual display, in an attempt to realize display by means of a plurality of languages. In this drawing, not only Japanese subtitles are disposed at the positions pp1 and pp2, but also English subtitles are disposed at the positions pk1 and pk2.

In this drawing, if a subtitle switching operation is performed after the position pk1 and before the position pp2 (e.g. the position ty1), then it is after the position at which the sub-picture data is disposed. Therefore, neither one of sub-picture data corresponding to the language before switched to another, nor sub-picture data corresponding to the language to which another is switched can be obtained. This means that a state continues in which none of subtitles in any language can be displayed, until the playback position reaches the position pp2 or pk2.

The second embodiment, in order to prevent the lack of subtitles in language switch, gives the sub-picture data with redundancy. Here, the redundancy means that the same sub-picture data is copied several times, and the resulting copies will be disposed during the display period of the subtitle, in stead of disposing the subpicture data a little before the display period of the subtitle. The disposition interval for the copies corresponds to the time interval of the Access Unit.

Figure 31:
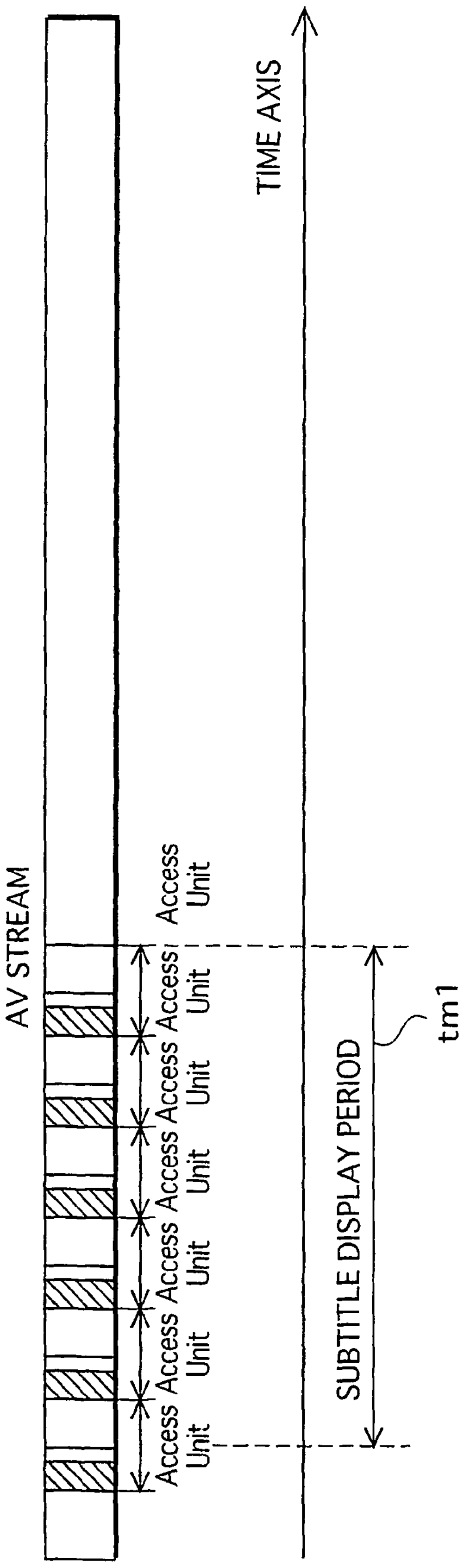
FIG. 31 is a diagram showing a disposition example when providing the sub-picture data with redundancy.

FIG. 31 is a diagram showing the disposition example in a case where the sub-picture data has such a redundancy. In this drawing, it can be seen that the same sub-picture data is copied several times, so that each copy is disposed at a place corresponding to each Access Unit of the display period of the sub-title. If language switching is performed during the display period of the subtitle, since every Access Unit has a copy of the sub-picture data, the sub-picture data can be obtained from the next Access Unit to the Access Unit to which the position at which the switching operation is performed belongs to, so as to display the obtained subtitle. Since the time interval of Access Unit is about 1 second, the lack of the subtitle can be only less than about a second.

The aforementioned redundancy of sub-picture data is realized by improving the multiplexing parameter that the BD scenario generating apparatus 7 transfers to the multiplexer 6. A multiplexing parameter represents sub-picture data to be multiplexed and the disposition position of the sub-picture data. The disposition position of the sub-picture data is determined such that one piece of sub-picture data has a plurality of disposition positions. The plurality of disposition positions have about a second of time interval therebetween. Therefore, if the multiplexer 6 performs multiplexing according to this multiplexing parameter in creation of a BD-ROM volume image, the volume image in which each Access Unit has a piece of sub-picture data can be created, just as shown in FIG. 31.

As described above, according to the present embodiment, the multiplexer 6 can perform multiplexing, so that same sub-picture data can be disposed at a plurality of positions in the digital stream. Therefore, in distribution of the movie content through BD-ROM, it becomes possible to produce a BD-ROM that does not lack any subtitle, during the language switch.

Note here that only subtitle lack during the subtitle switching has been described in the above. However, needless to say, the present embodiment is applicable to the subtitle lack during the angle switch within the multi-angle sections. In addition, the interval of disposing the copies of sub-picture data may be regular, or varied.

The Third Embodiment

Figure 32:
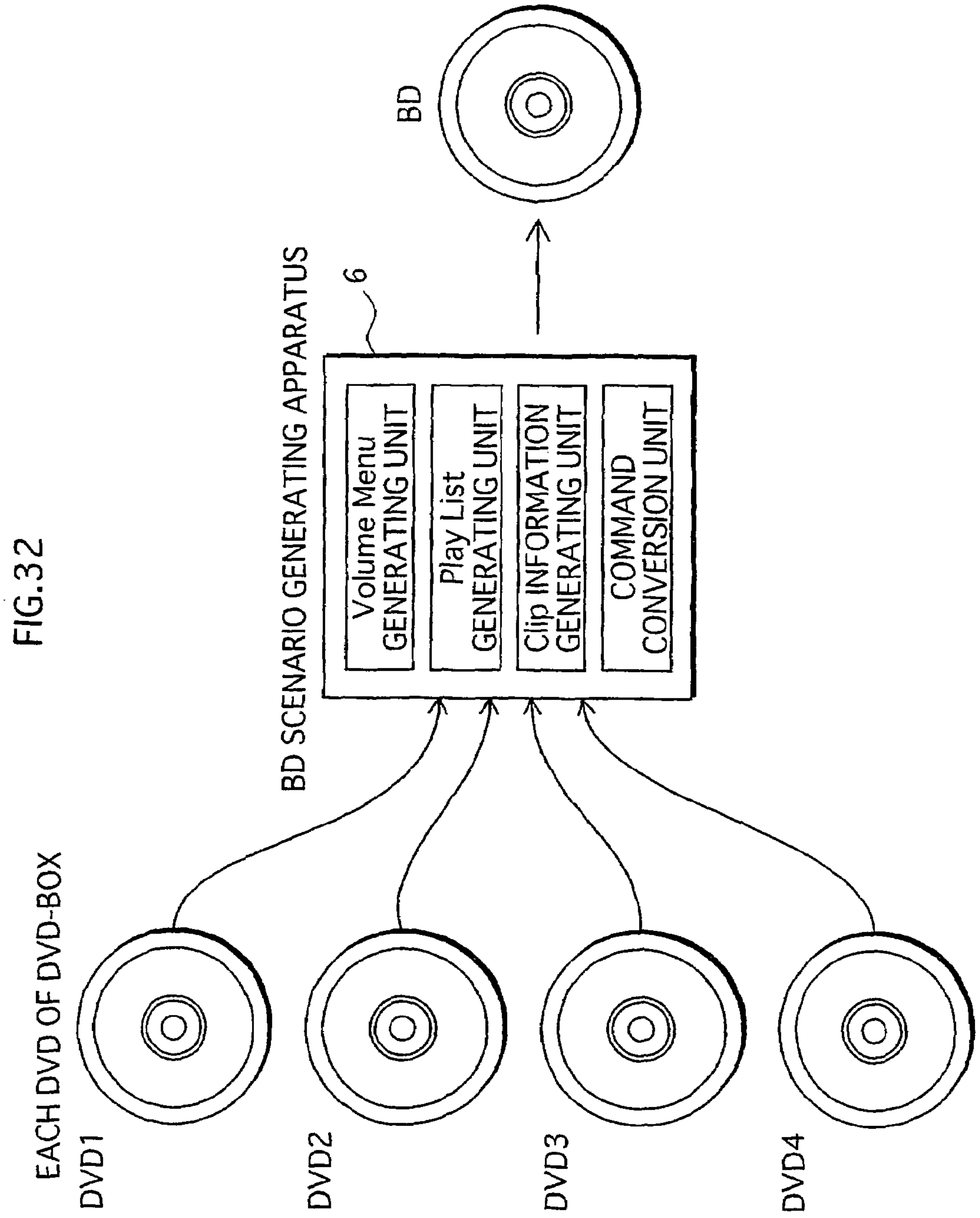
FIG. 32 is a diagram showing what kind of operation the BD scenario generating apparatus 7 performs, in a case when the scenarios for the four DVD-Videos (DVD1, 2, 3, 4) belonging to the DVD-BOX have been already generated.

The third embodiment relates to improvements in distributing a series of movie contents that used to be distributed with use of DVD-BOX, through a single BD-ROM. Surely, the fact that a series of movie contents that used to be distributed in the form of DVD-BOX can be distributed through a single BD-ROM is another large merit of movie contents distribution through BD-ROM. More specifically, a series of movie contents having 20 stories used to be distributed through a DVD-BOX comprised of four or five sets of DVD-Videos. On the other hand, BD-ROM can have four or five times larger capacity than DVD-Video. Therefore, one BD-ROM is enough for distributing these 20 stories of movie contents. This eliminates a distribution cost and a storage space, that is incident to the distribution. FIG. 32 is a diagram showing what kind of operations the BD scenario generating apparatus 7 performs, in a case when the scenario for four DVD-Videos (i.e. DVD 1, 2, 3, 4) that belongs to one DVD-BOX has been already created. The BD scenario generating apparatus 7 converts the scenarios for DVD1, 2, 3, 4 into BD-ROM scenarios, and combines the scenarios after conversion into one piece of scenario.

Figure 33:
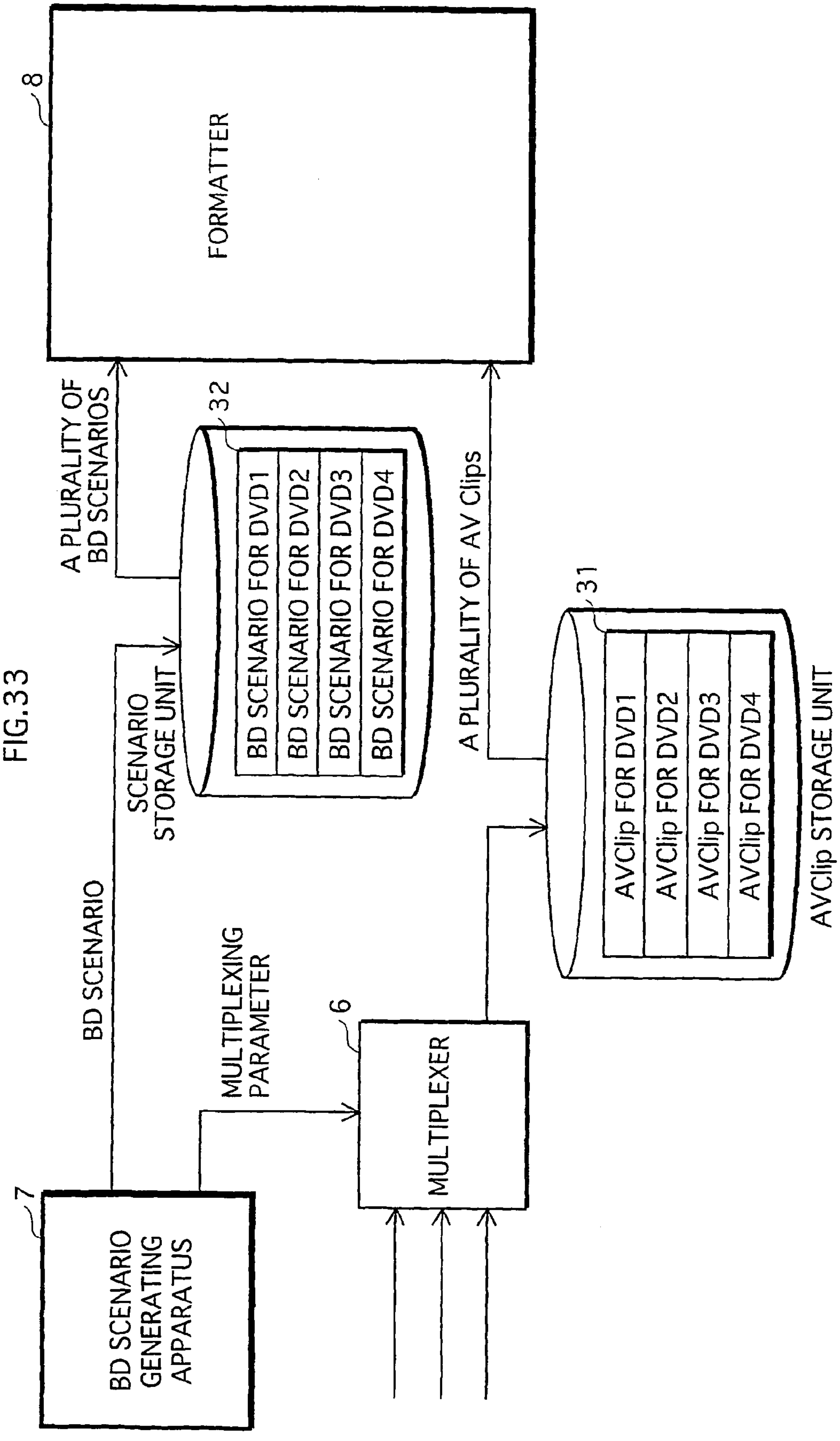
FIG. 33 is a diagram showing the internal structure of the generating apparatus, in which an AVClip storage unit 31 is provided between the multiplexer 6 and the formatter 8, and a scenario storage unit 32 is provided between the BD scenario generating apparatus 7 and the formatter 8.

The improvements resulting from the third embodiment are shown in FIG. 33. As shown in this drawing, the third embodiment provides an AVClip storage unit 31 between the multiplexer 6 and the formatter 8, and a scenario storage unit 32 between the BD scenario generating apparatus 7 and the formatter 8, which are the improvements of this embodiment.

The AVClip storage unit 31 is an HD for temporarily storing therein AVClips for BD-ROM, which the multiplexer 6 has obtained. This AVClip storage unit 31 stores AVClips that have the same contents as the plurality of VOBs that are to be stored in the DVD-Videos of the DVD-BOX. In the example of this drawing, regarding the four DVD-Videos (i.e. DVD1, 2,3,4) that constitute DVD-BOX, the following four AVClips will be stored in the AVClip storage unit 31: the AVClip having the same contents as the VOB of the DVD1; the AVClip having the same contents as the VOB of the DVD2; the AVClip having the same contents as the VOB of the DVD3; and the AVClip having the same contents as the VOB of the DVD4.

The scenario storage unit 32 is an HD for temporarily storing therein scenarios for BD-ROM, which the BD scenario generating apparatus 7 has obtained. This scenario storage unit 32 stores BD-ROM scenarios having been obtained by converting each of the DVD-Videos of the DVD-BOX. In the example of this drawing, regarding the four DVD-Videos (i.e. DVD 1, 2, 3, 4) that constitute DVD-BOX, the following four BD-ROM scenarios will be stored in the scenario storage unit 32: the BD-ROM scenario obtained by converting the scenario of the DVD1; the BD-ROM scenario obtained by converting the scenario of the DVD2; the BD-ROM scenario obtained by converting the scenario of the DVD3; and the BD-ROM scenario obtained by converting the scenario of the DVD4.

When attempting to store, in a single BD-ROM, the scenarios that each used to be stored in a plurality of DVD-Videos, what becomes problematic is how to deal with the numbering directed to the PGC information of the title within each DVD-Video. With DVD-BOX, the numbering directed to the PGC information of the title within each DVD-Video is performed on a VTS in each DVD-Video, independently.

So as to store, to a single BD-ROM, the titles having been recorded in the plurality of DVDs, the title #r belonging to the VTS#q of the DVD-Video#p is converted into the title #t of the BD-ROM, using the following expression 1.

$$\text{Title}\#t = \text{the number of Titles up to the } DVD\#p-1 + \text{the number of Titles up to the } VTS\#q-1 \text{ in the } DVD\#p + \text{Title}\#r \quad \{\text{expression 1}\}$$

So as to store a plurality of pieces of PGC information to a single BD-ROM, the PGC information #r belonging to the VTS#q of the DVD-Video#p is converted into the Play List#t of the BD-ROM, using the following expresson 2.

$$PL\#t = \text{the number of } PGCs \text{ up to the } DVD\#p-1 + \text{the number of } PGCs \text{ up to the } VTS\#q-1 \text{ in the } DVD\#p + PGC\#r \quad \{\text{expression 2}\}$$

The numbering directed to the buttons of the volume menu for each DVD-Video is also performed on each DVD-Video, independently. So as to integrate the buttons of the volume menus for DVD-Videos, into one button for the volume menu, the button #u of the volume menu within the DVD-Video#p is converted into the button #v of the BD-ROM, using the following expression 3.

$$\text{The button } \#v \text{ of the Title Menu} = \text{the number of buttons of the volume menus up to the } DVD\#p-1 + \text{the button } \#u \text{ of the volume menu for the } DVD\#p \quad \{\text{expression 3}\}$$

Figure 34:
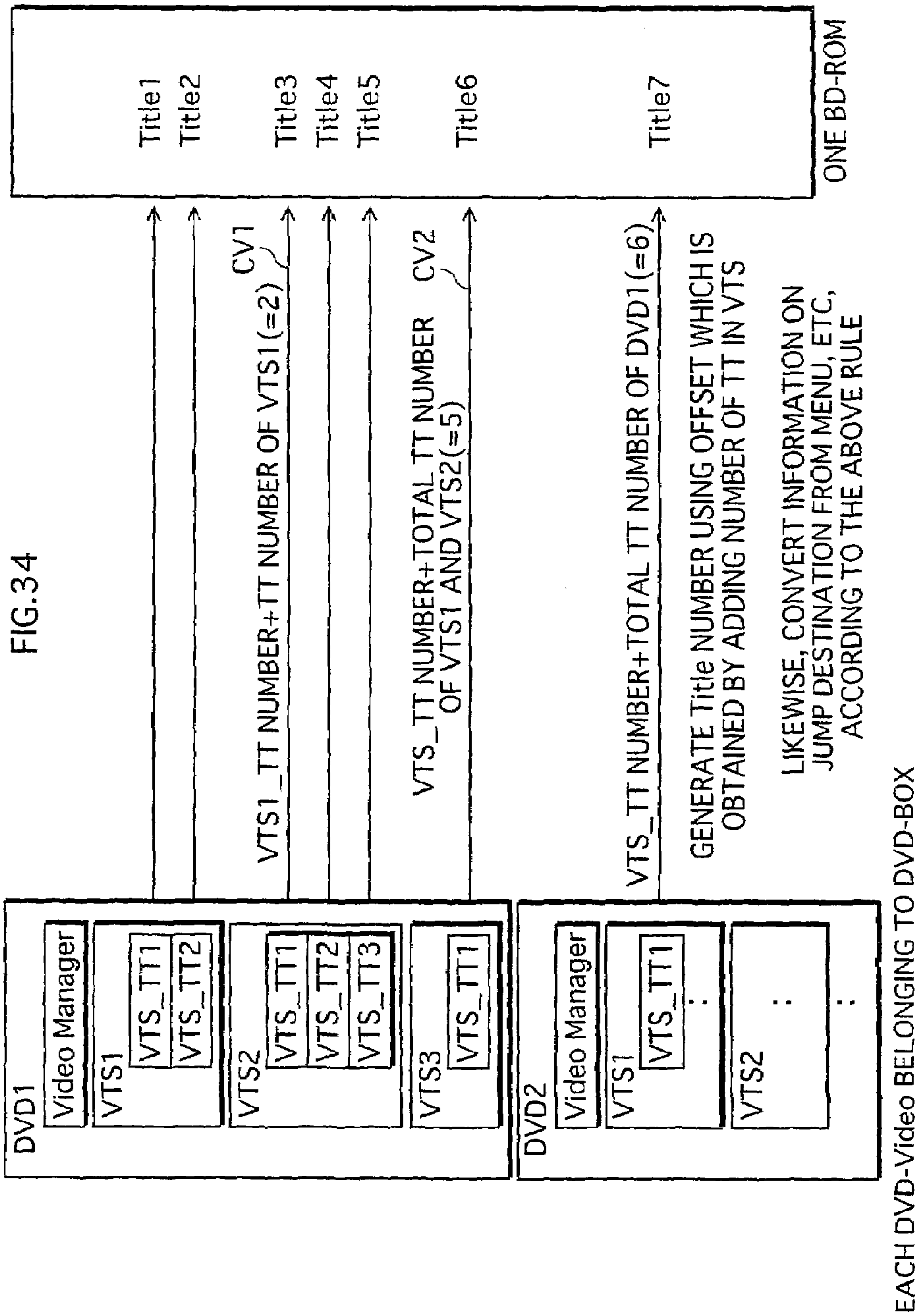
FIG. 34 is a diagram showing how the title number is converted by means of renumbering.

FIG. 34 is a diagram showing how the title number is converted, according to the renumbering of the expression 1. The BD-ROM is shown at the far-right portion of the drawing, and each DVD(DVD1,2) belonging to the DVD-BOX is shown at the far-left portion of the drawing. There are three domains VTS1, 2, 3 in the DVD1, and there are two domains VTS1,2 in the DVD2. "VTS_TT" within each VTS is a Video Title belonging to the domain VTS, and indicates that there are two titles VTS_TT1,2 within the VTS1 of the DVD1, and three titles VTS_TT1, 2, 3 within the VTS2.

The arrow signs "cv1, 2, 3, 4" in FIG. 34 show how to perform the renumbering in the third embodiment. The arrow sign "cv1" indicates that the VTS.TT1 belonging to the VTS2 of the DVD1 is converted to the Title 1 of the BD-ROM. This conversion is realized by summing the title number (=1) of the VTS2 and the total number of titles for the VTS (i.e. 3=1+2).

The arrow sign "cv2" in FIG. 34 shows that VTS_TT1 belonging to the VTS3 of the DVD1 is converted into the Title 6 of the BD-ROM. This conversion is realized by summing the title number (=1) and the total number of titles for the VTS 1,2 (=5) (i.e. 6=1+5).

The arrow sign "cv3" in FIG. 34 shows that VTS_TT1 belonging to the VTS1 of the DVD2 is converted into the Title 7 of the BD-ROM. This conversion is realized by summing the title number for the VTS1 of the DVD2 and the total number of titles for the VTS1, 2, 3 of the DVD1 (=6) (i.e. 7=1+6).

Since it becomes possible to unify such as the number of PGC information and Movie Objects, which used to have independent numbering for each VTS within the DVD-Video, it makes it easier to perform operations required for distribution through one BD-ROM the series of movie contents which used to be distributed through the DVD-BOX.

The Fourth Embodiment

In the first embodiment, the units within the BD scenario generating apparatus 7, that are specifically from the Clip information generating unit 11 to the command conversion unit 14, are used to convert the DVD scenario into the BD-ROM scenario. However in the fourth embodiment, the conversion that used to be performed by the units from the Clip information generating unit and the command conversion unit 14 is replaced by the procedural document called "conversion rule", and this conversion rule is described in the table of the BD scenario generating apparatus 7 in advance. The conversion in this fourth embodiment is realized by using this conversion rule. This enables a flexible response against the change or addition in data that becomes of the scenario.

The Fifth Embodiment

From the first embodiment to the fourth embodiment, the generated scenario and digital stream, and the like, are converted into a volume image, in order to record them on the BD-ROM that is a read-only disc. However, in the fifth embodiment, the scenario generated by the BD scenario generating apparatus 7 and the digital stream generated by the multiplexer 6, and the like, are written into a disc which is recordable. Concretely, the recordable disc includes: a rewritable recording medium such as DVD-RE, DVD-RAM, and DVD-RW; and a write-once recording medium such as DVD-R and BD-R. In order to perform such writing, the generating apparatus that relates to the fifth embodiment, instead of being equipped with the frame memories 9*a*, *b*, and *c*, is equipped with a driving apparatus on which a BD-RE is mountable, for realizing writing such as a scenario generated by the BD scenario generating apparatus 7 and an AVClip generated by the multiplexer 6. By this arrangement, it becomes possible to use the title recorded on the DVD, on the side of the BD-ROM.

<Note>

So far, the present invention has (been described by way of embodiments. However, these embodiments are only examples that are expected to have the best possible effects in the present state of the art. Needless to say, the present invention may be realized with changes and modification, which are not depart from the scope of the invention. The representative examples of such changes and modifications include the following (A) (B).

(A) The information processing by means of the program shown in FIGS. 22-26 specifically uses a hardware resource such as a CPU and a frame memory. Therefore such a program can, by itself, constitute an independent invention. Although from the first through third embodiments, the program execution of the present invention is based on the premise that the program is being incorporated in the generating apparatus. However, it is possible to separate the program from the corresponding encoding apparatus, and execute the programs of the first through third embodiments, singly. The executing the program singly includes (1) producing such programs, (2) transferring programs on chargeable/nonchargeable basis, (3) renting, (4) importing, (5) providing the public with the programs through an interactive electric communication line, (6) offering transferring or renting, to users in general, such as by exhibition at the shop, through catalogue solicitation, and by distribution of pamphlets.

The aforementioned pattern (5) (i.e. provision through an interactive electric communication line) includes: the provider sending the program to a user, and making the user use the program (i.e. a program download service), and the provider providing a user with only the function of the program through the electric communication line, while keeping the program itself at the hand of the provider (i.e. function-providing type ASP service).

(B) In the flowcharts of FIGS. 22-26, the time concept, which each step executed chronologically has, is supposed to be an indispensable item for the present invention. Then, the procedures shown in these flowcharts show the use patterns of the authoring method. These flowcharts are exactly the embodiments for the use patterns in which the authoring method relating to the present invention is to be used. If the processes at these flowchart are executed so as to achieve the original object of the present invention and have a certain effect, by chronologically executing the process at each step, it corresponds to an embodiment of the authoring method relating to the present invention.

INDUSTRIAL APPLICATION

The playback apparatus according to the present invention is able to be produced in quantity, based on the internal structure disclosed above in the embodiments. Therefore, the playback apparatus according to the present invention is able to be used industrially, in nature.

The invention claimed is:

1. A generating apparatus that generates, based on a first volume image for a first disc, a second volume image for a second disc, the generating apparatus comprising:

a conversion unit operable to convert first scenario data written under a first scenario-description scheme for the first disc, into second scenario data written under a second scenario-description scheme for the second disc; and a formatting unit operable to obtain the second volume image that contains a digital stream and the second scenario data that has been obtained by the conversion unit, wherein the stream contained in the first volume image and the digital stream contained in the second volume image respectively are paired with corresponding path information to constitute a title, the first scenario data and the second scenario data are respectively a jump table that a playback apparatus refers to when jump is performed from an entire menu of the corresponding disc to the corresponding title, the first scenario-description scheme allows two jump tables, a first table for the entire first disc and a second table that is created for a domain that the title belongs to, and the conversion performed by the conversion unit is to replace the first and second tables with one jump table for the entire second disc.

2. The generating apparatus of claim 1, wherein two or more titles that share same image/audio attributes belong to the domain.

3. The generating apparatus of claim 2, wherein the domain is assigned attribute information representing image/audio attributes of the titles that belong to the domain, and the generating apparatus includes a generating unit operable to generate attribute information for the digital stream contained in the second volume image, based on the attribute information assigned to the domain.

4. A method for providing a computer-readable program through an electronic communication line that makes a computer perform procedures for generating, based on a first volume image for a first disc, a second volume image for a second disc, wherein the computer executes:

a conversion step of converting first scenario data written under a first scenario-description scheme for the first disc, into second scenario data written under a second scenario-description scheme for the second disc; and a formatting step of obtaining the second volume image that contains a digital stream and the second scenario data that has been obtained at the conversion step, wherein the digital stream contained in the first volume image and the digital stream contained in the second volume image respectively are paired with corresponding path information to constitute a title, the first scenario data and the second scenario data are respectively a jump table that a playback apparatus refers to when jump is performed from an entire menu of the corresponding disc to the corresponding title, the first scenario-description scheme allows two jump tables, a first table for the entire first disc and a second table that is created for a domain that the title belongs to, and the conversion performed at the conversion step is to replace the first and second tables with one jump table for the entire second disc.

5. The method of claim 4, wherein two or more titles that share same image/audio attributes belong to the domain.

6. The method of claim 5, wherein the domain is assigned attribute information representing image/audio attributes of the titles that belong to the domain, and the computer executes a generating step of generating attribute information for the digital stream contained in the second volume image, based on the attribute information assigned to the domain.

* * * * *

UNITED STATES PATENT AND TRADEMARK OFFICE

CERTIFICATE OF CORRECTION

PATENT NO. : 7,796,863 B2
APPLICATION NO. : 10/561208
DATED : September 14, 2010
INVENTOR(S) : Yasushi Uesaka et al.

It is certified that error appears in the above-identified patent and that said Letters Patent is hereby corrected as shown below:

Title Page,
The Priority Data of the Provisional Application No. 60/483,229, filed on June 30, 2003 needs to be added.

Signed and Sealed this

Fourteenth Day of December, 2010

David J. Kappos
*Director of the United States Patent and Trademark Office*